United States Patent
Ayachitula et al.

(10) Patent No.: US 12,294,503 B2
(45) Date of Patent: May 6, 2025

(54) SELF-LEARNING AUTOMATED INFORMATION TECHNOLOGY CHANGE RISK PREDICTION

(71) Applicant: Kyndryl, Inc., New York, NY (US)

(72) Inventors: Arun A. Ayachitula, Dobbs Ferry, NY (US); Rohit Khandekar, Jersey City, NJ (US); Upendra Sharma, Hartsdale, NY (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/331,361

(22) Filed: Jun. 8, 2023

(65) Prior Publication Data

US 2024/0414064 A1  Dec. 12, 2024

(51) Int. Cl.
*H04L 41/16* (2022.01)
*H04L 41/0604* (2022.01)
*H04L 41/0866* (2022.01)

(52) U.S. Cl.
CPC .......... *H04L 41/16* (2013.01); *H04L 41/0609* (2013.01); *H04L 41/0866* (2013.01)

(58) Field of Classification Search
CPC .. H04L 41/16; H04L 41/0609; H04L 41/0866
See application file for complete search history.

(56) References Cited

U.S. PATENT DOCUMENTS

| | | | |
|---|---|---|---|
| 10,580,012 B2 * | 3/2020 | Hausler | G06N 3/044 |
| 11,252,052 B1 * | 2/2022 | Babu Balasubramani | H04L 41/16 |
| 11,270,226 B2 | 3/2022 | Meng et al. | |
| 11,556,843 B2 | 1/2023 | Backas et al. | |
| 2017/0032035 A1 | 2/2017 | Gao et al. | |
| 2017/0178038 A1 * | 6/2017 | Guven | G06Q 30/016 |
| 2017/0310546 A1 * | 10/2017 | Nair | H04L 41/16 |
| 2019/0132191 A1 * | 5/2019 | Mann | H04L 41/16 |

(Continued)

FOREIGN PATENT DOCUMENTS

EP  3447696 A1  2/2019

OTHER PUBLICATIONS

Ayachitula, et al. "Explainable Classifications With Abstention Using Client Agnostic Machine Learning Models," U.S. Appl. No. 18/300,688, filed Apr. 17, 2023.

(Continued)

*Primary Examiner* — Patrice L Winder
(74) *Attorney, Agent, or Firm* — CANTOR COLBURN LLP; John Kennel

(57) ABSTRACT

Embodiments relate to providing self-learning automated information technology change risk prediction. A processor inputs a change request to a first machine learning model, the first machine learning model determining at least one word pair in the change request, the change request being a modification in an IT environment. The processor classifies the at least one word pair into a change category for the IT environment using a second machine learning model, the change category identifying a type of the modification to be executed in the IT environment. The processor determines a likelihood of causing a problem in the IT environment as a result of executing the modification. The processor automatically performs an action to prevent the modification of the change request in the IT environment.

25 Claims, 19 Drawing Sheets

(56) References Cited

U.S. PATENT DOCUMENTS

| | | | |
|---|---|---|---|
| 2019/0306023 A1* | 10/2019 | Vasseur | H04L 41/16 |
| 2020/0193243 A1 | 6/2020 | Dhurandhar et al. | |
| 2022/0156134 A1 | 5/2022 | Lehmann et al. | |
| 2022/0247630 A1* | 8/2022 | Engi | H04L 41/085 |
| 2022/0247638 A1* | 8/2022 | Engi | H04L 41/16 |
| 2022/0337495 A1* | 10/2022 | Safavi | H04L 41/16 |
| 2022/0400131 A1* | 12/2022 | Shao | H04L 63/1433 |
| 2023/0004761 A1* | 1/2023 | Batta | G06N 3/0455 |
| 2023/0164029 A1* | 5/2023 | Mermoud | H04L 41/16 |
| | | | 709/220 |
| 2024/0013123 A1* | 1/2024 | Latha | G06Q 10/06313 |
| 2024/0137267 A1* | 4/2024 | Brinksma | H04L 41/16 |
| 2024/0195692 A1* | 6/2024 | Liew | H04L 41/16 |
| 2024/0202443 A1* | 6/2024 | Yaghi | G06N 3/08 |

OTHER PUBLICATIONS

Ayachitula, et al. "Explainable Classifications With Abstention Using Client Agnostic Machine Learning Models," U.S. Appl. No. 18/300,699, filed Apr. 14, 2023.

Kyndryl: List of Kyndryl Patents or Patent Applications Treated as Related (Appendix P); Date Filed: Jun. 9, 2023; 2 pages.

International Search Report and Written Opinion; Application No. PCT/EP2023/063772; Filed: May 23, 2023; Date of mailing; Jan. 15, 2024; 15 pages.

Anonymous, "Natural language processing—Wikipedia," URL: https://en.wikipedia.org/wiki/Natural_language_processing; Retrieved: Feb. 1, 2024; 13 pages.

International Search Report and Written Opinion; Application No. PCT/EP2023/071905; Filed: Aug. 8, 2023; Date of mailing: Feb. 6, 2024; 11 pages.

* cited by examiner

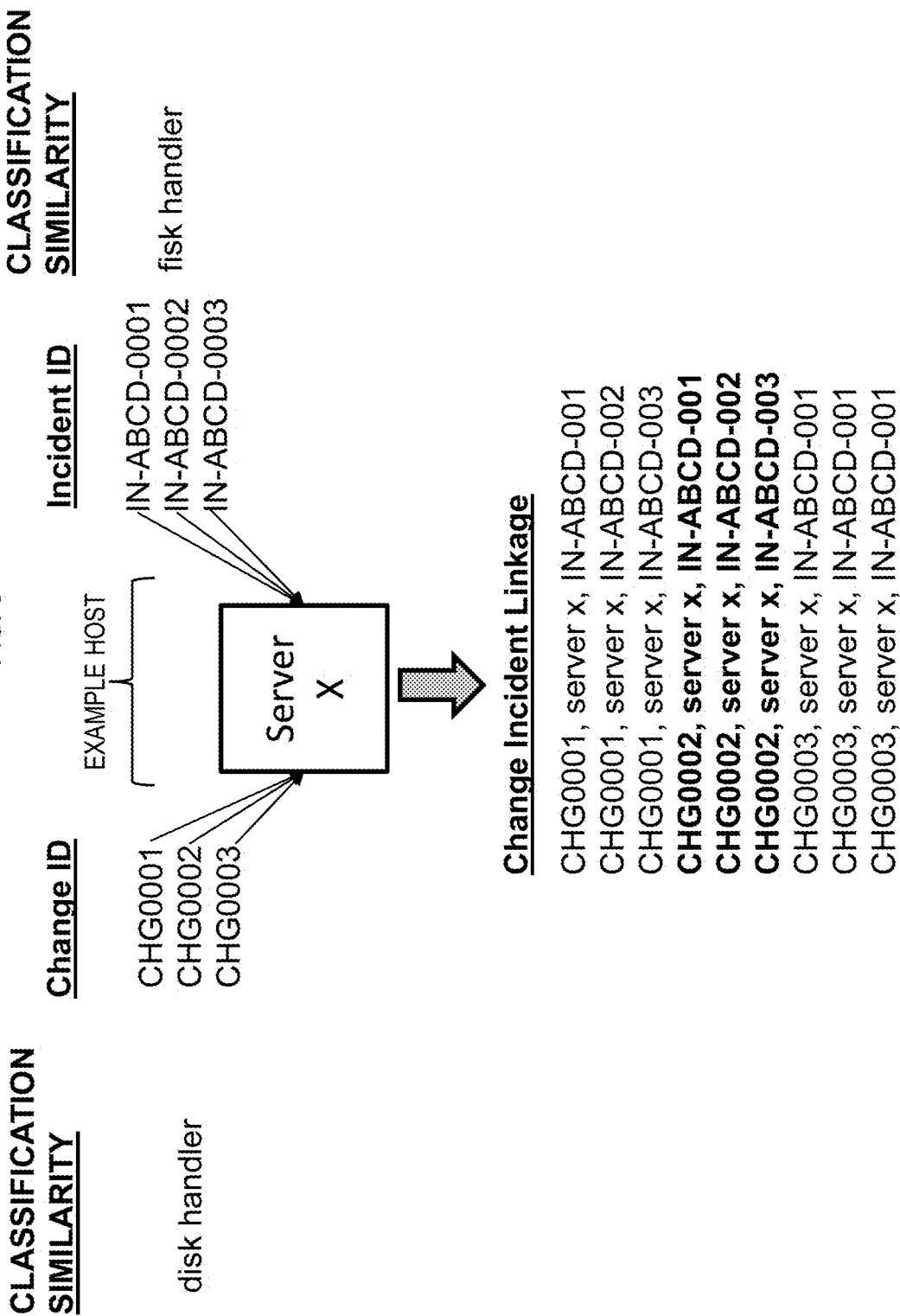

Change Information

| Change ID | Change Request Date | Change Schedule Date | Change Status | Change Category | Explanation | Change Owner | Change Abstract Desc |
|---|---|---|---|---|---|---|---|
| CH54458873 | Feb 15, 2023 11:01:49.338 | Feb 24, 2023 11:00:00.000 | WAPPR | Datacenters, Internet, Netw.Security LU | Predicted risk is higher than assigned risk, due to the following risk dimensions: 25% failure rate for category, 21% failure rate | K-QPO-NS-KHN-SPN-UGD_QGESPKRW | [ABC][DEx][ABc] F5 Upgrade 15.1.6.1 + Troubleshoot BILNET-SSO Apps + Rollback |

MINOR — 712

CRITICAL — 710

720

722

| Failure Risk–Risk Dimensions | Risk Rating | Risk Explanation | | |
|---|---|---|---|---|
| Failure risk by similar changes | Low | 0% failure rate for similar changes | | |
| Failure risk by owner group | Extremely High | 21% failure rate for owner | | |
| Failure risk by configuration items | Low | 0% configuration items involved in the change had change failures in the past | | |
| Failure risk by change type | Extremely High | 25% failure rate for category | | |

| Incident Risk - Risk Dimensions | Risk Rating | Risk Explanation | |
|---|---|---|---|
| Incident risk by similar changes | Low | 0% change-induced incident rate for similar changes |  |
| Incident risk by owner group | Low | 0% change-induced incident rate for owner |  |
| Incident risk by configuration items | Low | 0% configuration items involved in the change had incidents in the past |  |
| Incident risk by change type | Low | 0% change-induced incident rate for category |  |

FIG. 8

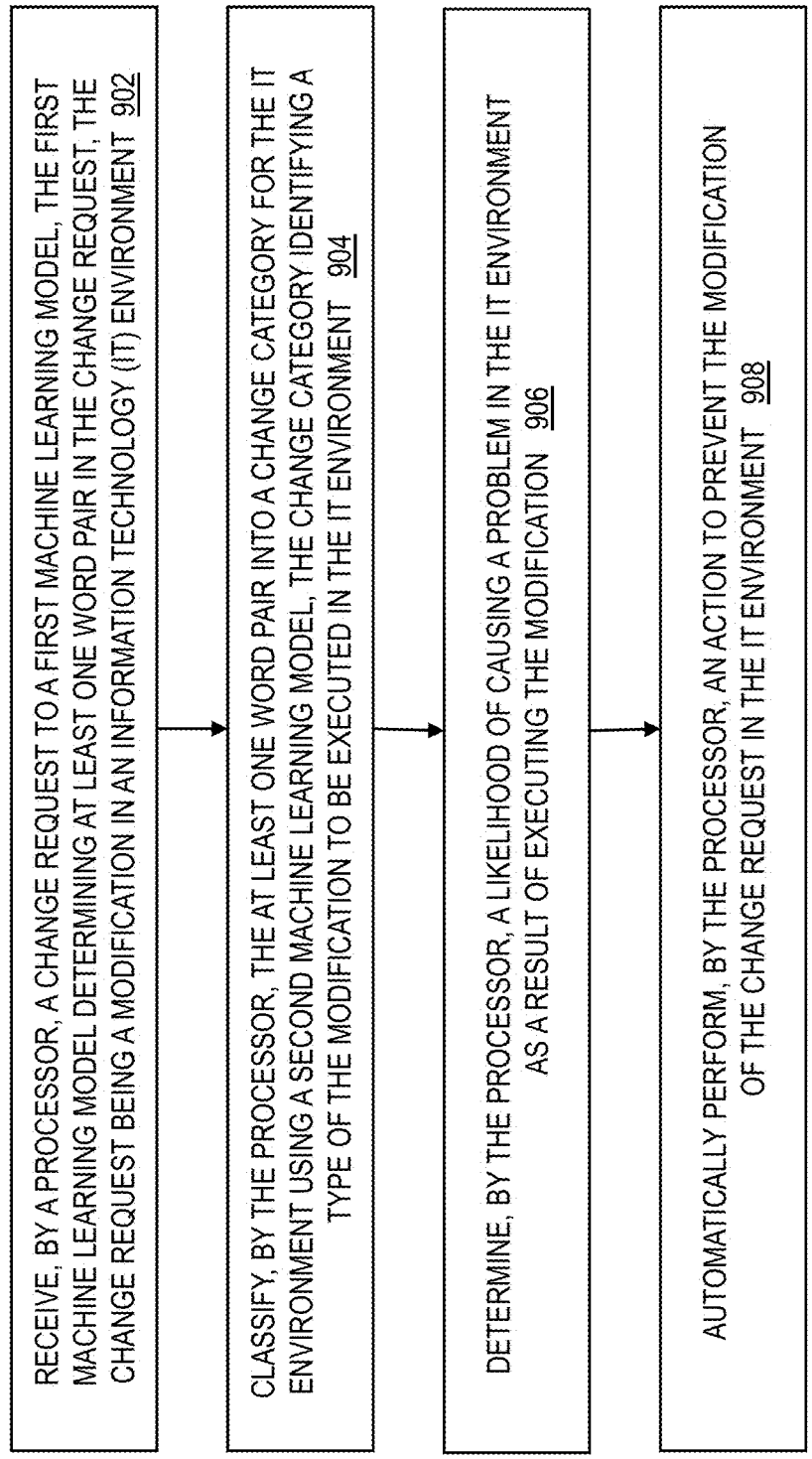

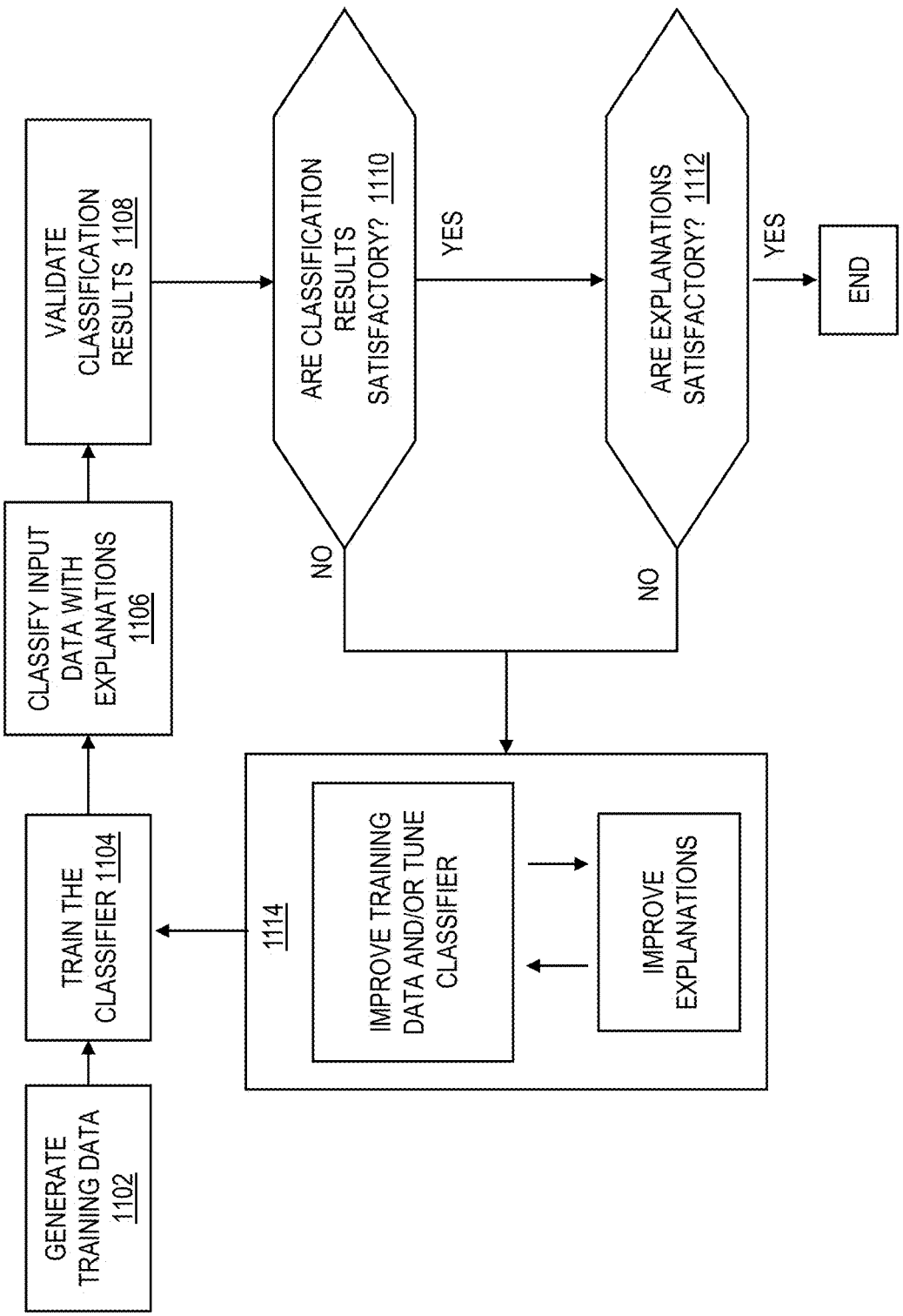

FIG. 12B

| Features | Coefficient Matrix / Class Labels | | | | | | | |
|---|---|---|---|---|---|---|---|---|
| | Service Handler | Disk Handler | Hostdown Handler | Database Space Issue | SAP Batch Jobs | Job Aborts | Missed and Failed Backup | System Disk |
| backup | -25.1 | -21.76 | -7.16 | -24.96 | -21.36 | 0 | 19.59 | -7.56 |
| space | -13.94 | 15.6 | -6.43 | -28.65 | -22.03 | 0 | 0 | 0 |
| unreachable | -14.62 | 0 | 20.56 | -12.14 | -10.33 | 0 | -12.32 | 0 |
| workspace | -15.87 | 19.53 | 0 | -14.48 | -16.18 | 0 | -6.52 | 0 |
| response | -11.33 | 0 | 16.38 | -9.76 | -9.83 | 0 | -6.19 | 0 |

FIG. 13A

| PREDICTED LABELS | UNIVERSE OF PERTINENT POSITIVES |
|---|---|
| | PERTINENT POSITIVES |
| DISK HANDLER | • LOW SPACE<br>• DISK C: HANDLER<br>• FILE SYSTEM |
| CPU HANDLER | XYZ |
| MEMORY HANDLER | ABC |
| ... | ... |

FIG. 13B

Feature removal

| ClassLabel | Feature | Coefficient |
|---|---|---|
| Application Down | space | -8.05 |
| Database Inactive/Locked | space | -19.40 |
| Database Space Issue | space | -28.65 |
| Disk Handler | space | 15.60 |
| Network Connectivity | space | -0.69 |
| FileSystem Mount Handler | space | 1.70 |
| High Memory & Page File Usage Handler | space | -12.28 |
| Hostdown Handler | space | -8.43 |
| Process CPU Spike Handler | space | -10.74 |
| Process Down Handler | space | -16.06 |
| SAP Batch Jobs | space | -22.00 |
| Service Handler | space | -13.34 |
| Too Many Daemons | space | -1.85 |
| Zombies handler | space | -1.71 |

Legend: Pertinent Positive (PP), Pertinent Negative (PN)

SELF-LEARNING AUTOMATED INFORMATION TECHNOLOGY CHANGE RISK PREDICTION

BACKGROUND

The present invention generally relates to computer systems, and more specifically, to computer-implemented methods, computer systems, and computer program products configured and arranged to provide self-learning automated information technology (IT) change risk prediction.

An information technology ticketing system is a tool used to track IT service change requests, events, incidents, and alerts that might require additional action from the IT department. Ticketing software allows organizations to resolve their internal IT issues by streamlining the resolution process. The elements they manage, called tickets, provide context about the issues including details, categories, and any relevant tags. The ticket often contains additional contextual details and may also include relevant contact information of the individual who created the ticket. Tickets are usually employee-generated, but automated tickets may also be created when specific incidents occur and are flagged. Once a ticket is created, it is assigned to an IT agent to be resolved. Effective ticketing systems allow tickets to be submitted via a variety of methods. These include submissions through virtual agents, phone, email, service portals, live agents, walk-up experience, etc.

In general, automation systems automate aspects of the environment and problem resolution, and event monitoring software monitors components and the environment, so that incidents are reported via tickets through the ticketing system. A typical system may use natural language to monitor a ticket and output, via general language classifiers. Changes are made to the components in the IT environment in accordance with change request tickets. Unfortunately, the changes made to software and hardware components in the IT environment can lead to incidents. What is needed is a system that can avoid change induced incidents in the IT environment.

SUMMARY

Embodiments of the present invention are directed to computer-implemented methods for providing self-learning automated information technology change risk prediction. A non-limiting computer-implemented method includes inputting, by a processor, a change request to a first machine learning model, the first machine learning model determining at least one word pair in the change request, the change request being a modification in an information technology (IT) environment. The method includes classifying, by the processor, the at least one word pair into a change category for the IT environment using a second machine learning model, the change category identifying a type of the modification to be executed in the IT environment. The method includes determining, by the processor, a likelihood of causing a problem in the IT environment as a result of executing the modification. The method includes automatically performing, by the processor, an action to prevent the modification of the change request in the IT environment.

This can provide an improvement over known methods for static risk because one or more embodiments provide improved accuracy by accounting for variations/nuances of change properties that vary over time for change requests. The method can predict major incidents and outages that could occur as a result of a change to the IT environment. Being trained on historical data, the method identifies and analyzes the relationship between incidents and changes that caused them in order to prevent changes to the IT environment that have a likelihood or risk that meets a threshold. Further, the method avoids, prevents, and/or blocks the processing of change tickets from being automatically processed by an automated system to erroneously change software and/or hardware components in one or more computer systems, based on the likelihood/risk of causing a problem meeting a threshold.

In addition to one or more of the features described above or below, the first machine learning model uses an ontology to determine the at least one word pair, the ontology comprising a knowledge base of IT concepts and relations among the concepts. This advantageously allows the first machine learning model to determine the action in the change ticket, which is utilized to determine the likelihood/risk of causing a problem associated with making the change in the change ticket.

In addition to one or more of the features described above or below, the second machine learning model is trained on training data of change tickets for the IT environment in order to learn to classify the change tickets into change categories. This advantageously allows the second machine learning model to determine the classification/change category, which is utilized to determine the likelihood/risk of causing a problem associated with making the change in the change ticket.

In addition to one or more of the features described above or below, the likelihood of causing the problem in the IT environment relates to a score that denotes a severity. This advantageously allows the score, when meeting a threshold, to be utilized to cause the method to avoid, prevent, and/or block the processing of change tickets from being automatically processed by an automated system to erroneously change software and/or hardware components in one or more computer systems.

In addition to one or more of the features described above or below, determining the likelihood of causing the problem in the IT environment is based on a failure risk dimension, a major incident risk dimension, and an availability risk dimension. By taking into account any one or more of the failure risk dimension, the major incident risk dimension, and/or the availability risk dimension, this method provides improved accuracy by accounting for variations/nuances of change properties that vary over time for change requests. The method can predict major incidents and outages that could occur as a result of a change to the IT environment. Being trained on historical data, the method identifies and analyzes the relationship between incidents and changes that caused them in order to prevent changes to the IT environment that have a likelihood or risk that meets a threshold.

In addition to one or more of the features described above or below, automatically performing the action to prevent the modification of the change request in the IT environment includes disabling input to a display screen by requesting user input associated with a display box, in response to the likelihood of causing the problem in the IT environment meeting a predefined threshold. This advantageously allows the IT professional to reconsider the change or further investigate how to improve the process for implementing the change. Further, the method avoids, prevents, and/or blocks the processing of change tickets from being automatically processed by an automated system to erroneously change software and/or hardware components in one or more computer systems, based on the likelihood/risk of causing a problem meeting a threshold.

In addition to one or more of the features described above or below, the predefined threshold is user configurable, and disabling the input to the display screen prevents the problem from occurring in the IT environment. This advantageously improves the functioning of computer systems in the IT environments by preventing erroneous or malicious changes to software and/or hardware components in one or more computer systems.

In accordance with one or more embodiments, a non-limiting computer-implemented method includes receiving, by a processor, a change ticket, the change ticket being for a modification in an information technology (IT) environment. The method includes classifying, by the processor, the change ticket into a change category that identifies a type of the modification to be executed in the IT environment, where classifying the change category is based on an ontology. The method includes determining, by the processor, a likelihood of causing a problem in the IT environment as a result of executing the modification in the change ticket. The method includes automatically preventing, by the processor, the modification of the change ticket in the IT environment until a user input is received.

This can provide an improvement over known methods for static risk because one or more embodiments provide improved accuracy by accounting for variations/nuances of change properties that vary over time for change requests. The method can predict major incidents and outages that could occur as a result of a change to the IT environment. Being trained on historical data, the method identifies and analyzes the relationship between incidents and changes that caused them in order to prevent changes to the IT environment that have a likelihood or risk that meets a threshold. Further, the method avoids, prevents, and/or blocks the processing of change tickets from being automatically processed by an automated system to erroneously change software and/or hardware components in one or more computer systems, based on the likelihood/risk of causing a problem meeting a threshold.

In addition to one or more of the features described above or below, automatically preventing the modification of the change ticket in the IT environment until the user input is received includes stopping an automatic resolution system from executing the modification of the change ticket. This advantageously allows the method to avoid, prevent, and/or block the processing of change tickets from being automatically processed by an automated system to erroneously change software and/or hardware components in one or more computer systems.

In addition to one or more of the features described above or below, automatically preventing the modification of the change ticket in the IT environment until the user input is received includes disabling input to a display screen by requesting the user input associated with a display box. This advantageously allows the method to avoid, prevent, and/or block the processing of change tickets from being automatically processed by an automated system to erroneously change software and/or hardware components in one or more computer systems.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of an example of change incident linkage using classification similarities and host identification in accordance with one or more embodiments of the present invention;

FIG. 7 depicts an example display screen illustrating an overall risk score for the change to the IT environment in accordance with one or more embodiments of the present invention;

FIG. 8 depicts an example display screen illustrating dimension predictors for a major outage/incident risk for the change to the IT environment according to one or more embodiments of the present invention;

FIG. 9 is a flowchart of a computer-implemented method for providing self-learning automated information technology change risk prediction for a change to the IT environment and preventing the change from being performed based on a change risk meeting a risk threshold according to one or more embodiments of the present invention;

FIG. 11 is a flowchart of a computer-implemented method for training a machine learning model for each classification label according to one or more embodiments of the present invention;

FIG. 12B depicts a block diagram illustrating an example coefficient matrix of the machine learning model according to one or more embodiments of the present invention;

FIG. 13A depicts an example chart illustrating the universe of the pertinent positive features determined to positively contribute to each of the predicted labels during the classification by the machine learning model according to one or more embodiments of the present invention;

FIG. 13B depicts an example chart illustrating how a particular feature contributes to the determination of class labels according to one or more embodiments of the present invention;

DETAILED DESCRIPTION

Figure 1:
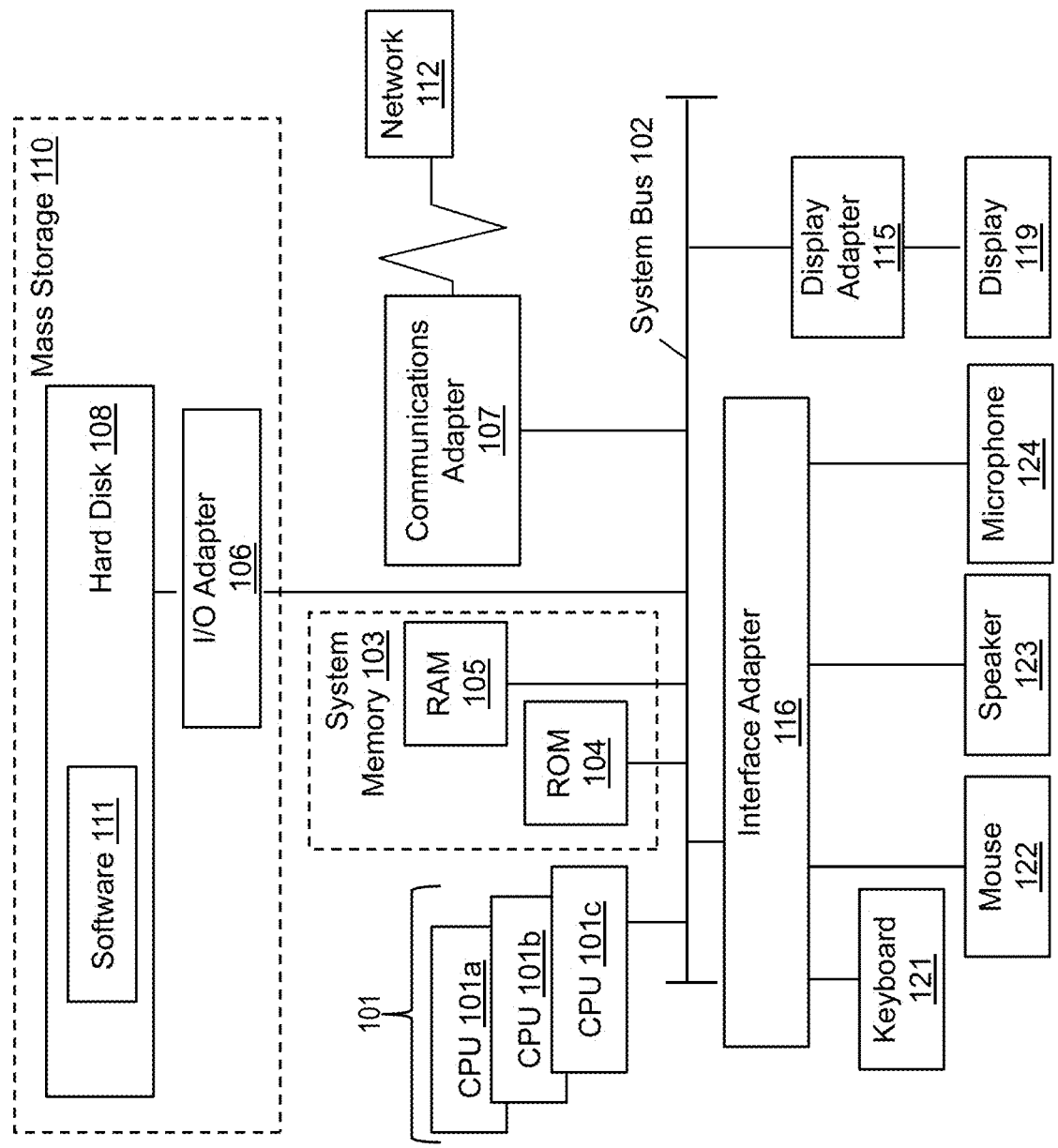
FIG. 1 depicts a block diagram of an example computer system for use in conjunction with one or more embodiments of the present invention.

One or more embodiments provide self-learning automated information technology (IT) change risk prediction. One or more embodiments are configured to assign a risk of the change at change creation time in order to predict if the change causes a major incident or an outage. The system is configured to establish relationships between changes via change tickets to an IT environment and incidents via incident tickets in the IT environment. The system can consider, for example, three dimensions that: (1) predict change failure risk, such as what is the risk of failure for the change; (2) determine major incident/outage risk, such as what is the possibility that the change will cause an outage; and (3) determine availability risk, for example, if the devices are not available for a certain period of time, this poses a risk.

One or more embodiments can provide notification of a potential change to the IT environment that meets a threshold. One or more embodiments can prevent changes to the IT environment from being performed based on the change risk meeting a threshold and optionally require the IT professional to take further actions. The further actions may require the IT professional to make a selection on a display screen acknowledging the change risk, to perform further review of the potential changes, to make a backup copy of the data including images on a separate computer system that is not affected by the change, create a separate communication channel as an alternative to any communication channel being changed in the IT environment, unlock the display screen as an additional step to performing the change, etc., and/or any combination thereof.

Incident identification and automated resolution is the process of managing IT service disruptions and restoring services. For example, a monitoring system monitors the IT environment of a client in an industry. The term "IT environment" refers to the infrastructure, hardware, software, and systems that a client (entity or business) relies on every day in the course of using information technology. Some of the commonly used resources in an IT environment include computers, internet access, peripheral devices, etc. Examples in the IT environment may include the following: hardware: routers, personal computers, servers, switches, and data centers; software: user applications, web servers and applications that make hardware connections effective and useable; and networking: firewalls, cables, and other components that facilitate internal and external communication in a business. Upon detection of a technical event in the IT environment and/or upon the request of a user of the IT environment, the monitoring system generates a ticket. The ticket can be sent to an automated resolution system and/or the IT department to be resolved. A ticket is a special document or record that represents an incident, alert, change request, and/or event that requires action from the IT department. Also, a ticket is a historical document that details a service event, such as an incident, problem, and/or service request. Tickets govern and control how a service event is processed.

In an IT environment, the majority of changes that cause incidents result from successful changes to the IT environment, for example, via a change ticket. The changes are successful in that the requested parameters were changed in the IT environment, although the aftereffect is disastrous in the IT environment because some incident resulted from the change. More than half the changes that cause incidents had minimal change risk at preparation time. When attempting to address the risk of changes, the state-of-the art may manually assign change risk when a change request is created. The state-of-the-art system may assign static risk based on a change category and/or something at change creation time; this provides an indication but is inaccurate due to the variations/nuances of change properties that vary over time. The typical system may simply indicate that a class of changes is risky or provide a basic assignment of risk based on some attributes. Although a state-of-the-art system could attempt to use weighting to determine risk, such a typical system produces lots of noise and is significantly inaccurate.

Technical solutions and benefits include a system that provides self-learning automated information change risk prediction according to one or more embodiments. In accordance with one or more embodiments, the system can assign a risk of a change at change creation time, which can predict major incidents and outages before they happen, for example, using historical operational data of the IT environment or multiple IT environments as training data. The system can assign risk associated with a change failure using historical operational data as training data. The system can identify and analyze the relationship of changes leading to failures by analyzing change tickets and incident tickets and determine the linkage between change tickets and incident tickets, thereby finding a causal connection for changes leading to failures. In accordance with one or more embodiments, the system considers multiple predictors including: change failure risk (e.g., using four dimension predictors), major incident/outage risk (e.g., using four dimension predictors), and availability risk (e.g., using two dimension predictors). As an example, when the IT professional is in the process of implementing a change to the IT environment, the system is configured to determine the likelihood that the ongoing (or future) change will cause an incident/outage, provide the evidence of why the determination is made, and/or disable the ongoing change until a selection on a display is made/acknowledged by the IT professional. Some embodiments may not have these potential benefits or advantages, and these potential benefits or advantages are not necessarily required of all embodiments.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
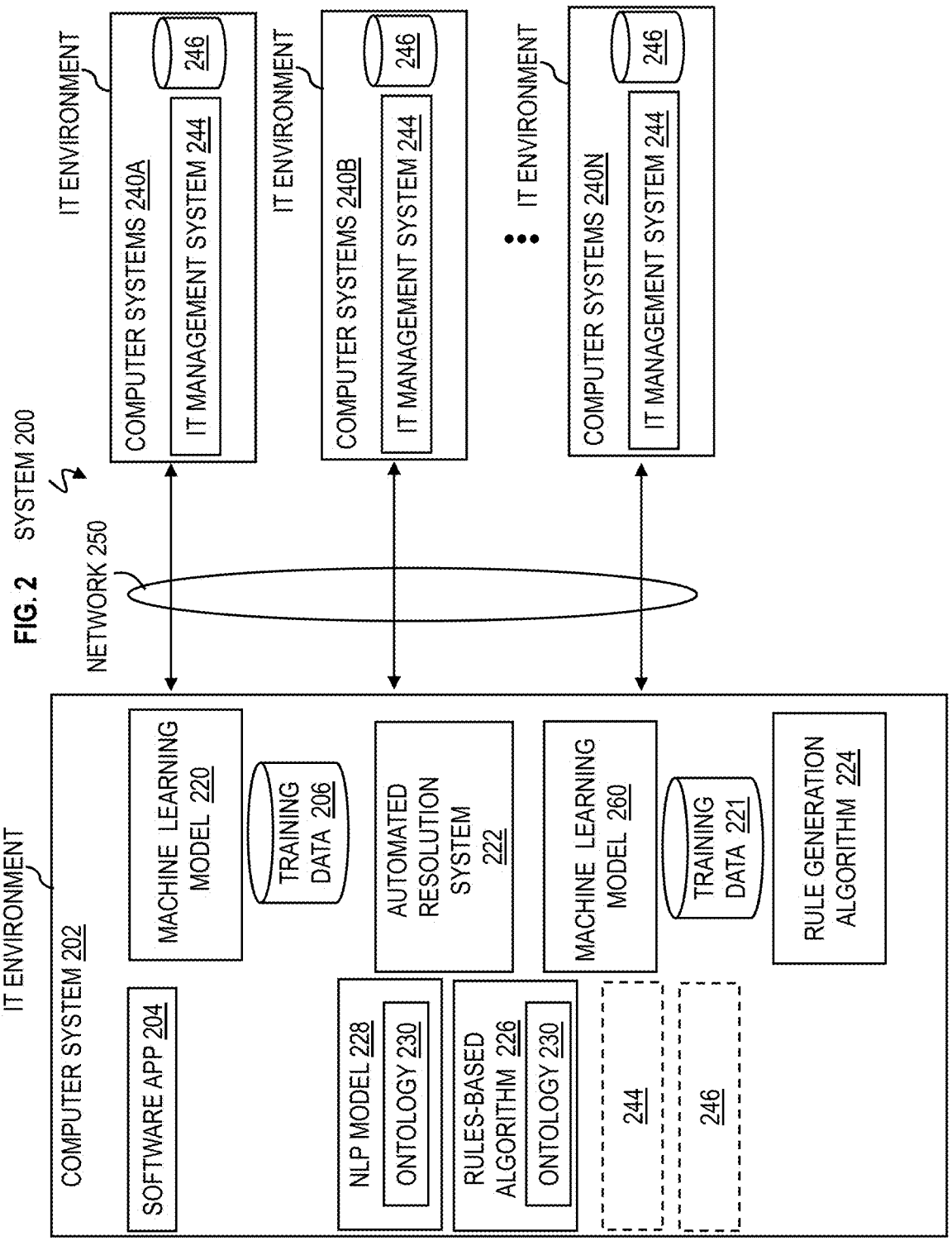
FIG. 2 depicts a block diagram of an example system configured to provide a self-learning automated information change risk prediction for a change to an IT environment and prevent the change from being performed based on a change risk meeting a threshold according to one or more embodiments of the present invention.

FIG. 2 depicts a block diagram of an example system 200 configured to provide self-learning automated information technology change risk prediction for a change to the IT environment, provide notification that the change to the IT environment meets a risk threshold, and prevent the change from being performed based on the change risk meeting a risk threshold, thereby requiring receipt of further actions taken by the IT professional according to one or more embodiments. The system 200 includes a computer system 202 configured to communicate over a network 250 with many different computer systems, such as a computer system 240A for managing the IT environment for one client, a computer system 240B for managing the IT environment for another client, through a computer system 240N for managing the IT environment for yet another client. The computer systems 240A, 240B, through 240N can generally be referred to as computer systems 240. Each of the computer systems 240 can have its own IT management system 244 for monitoring the IT environment for the respective clients of their respective industries and storing their respective tickets and resolutions in ticket repositories 246. The ticket repositories 246 are operable to store a large number of tickets and their respective resolutions for the IT environments of the computer systems 240. The network 250 can be a wired or wireless communication network.

The IT management system 244 may include or be representative of a monitoring and ticketing system and an automated resolution system for each client. By the software application 204 communicating over the network 250, which can be a wired or wireless communication network, with the computer systems 240, the software application 204 is configured to extract various tickets and their respective resolutions in the ticket repositories 246 from different clients.

In one or more embodiments, the computer systems 240A, 240B, and 240N may be for the same client in a distributed network such as a cloud environment. In one or more embodiments, as illustrated with dashed lines, the computer system 202 may include respective IT management systems 244 and their ticket repositories 246 for one or more computer systems 240A-240N in their respective IT environments of clients or the same client. The computer system 202 can manage the IT environments of the clients for one or more computer systems 240A-240N. Any portion of the system 200 including the computer system 202 and one or more of the computer systems 240A-240N can be part of a cloud computing environment 50 (depicted in FIG. 15) as discussed further herein.

In system 200, the computer system 202, the computer systems 240A-240N, the IT management systems 244, the software application 204, training data 206, machine learning models 220, automated resolution system 222, rule generation algorithm 224, rules-based algorithm 226, machine learning model 260, NLP model 228, etc., can include and/or use any of the functionality discussed in computer system 100 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software application 204 may be representative of numerous software applications each constructed to perform its function.

The tickets including change tickets and incident tickets and their respective resolutions are stored in repositories, such as storages, as training data 206. The software application 204 filters the training data 206 to ensure that the training data 206 is only in the IT environment, which can also be referred to as the IT domain or IT space. The IT domain encompasses the IT environments of the clients in respective industries.

The computer system 202 includes a machine learning model 220, which is a client agnostic machine learning model that has been trained to (only) classify tickets in the IT environment. The machine learning model 220 may be representative of numerous machine learning models 220. The machine learning model 220 classifies the tickets by predicting a label that identifies how to resolve the computer problem associated with ticket. The ticket and its predicted label can be sent to an automated resolution system 222 to automatically resolve the computer problem of the ticket according to the predicted label output from the machine learning model 220. In one or more embodiments, the machine learning model 220 is a linear classifier and processes linear classifier algorithms. The terms label, class, classification, classification label, class label, etc., may be utilized interchangeably to refer to a category in machine learning.

The linear classification algorithm uses an object's characteristics, such as the characteristics of the ticket, to identify which class (or group) it belongs to. The linear classifier achieves this by making a classification decision based on the value of a linear combination of the characteristics. An object's characteristics are also known as feature values and are typically presented to the machine in a vector called a feature vector. Example of linear classification algorithms and techniques includes Naïve Bayes algorithms, linear discriminant analysis (LDA) algorithms, least squares algorithms, support vector machine algorithms, ridge regression algorithms, Lasso algorithms, elastic net algorithms, least angle regression algorithms, orthogonal matching pursuit algorithms, Bayesian regression algorithms, logistic regression algorithms, linear regression algorithms, perception algorithms, passive aggressive classifier algorithms, etc., as understood by one of ordinary skill in the art.

The machine learning model 220 can be configured with a trained linear classification algorithm for each classification label for the tickets. Additionally, the machine learning model 220 is configured to abstain from classifying tickets that do not fall within the scope of the IT environment or IT domain. In one or more embodiments, with a classification label denoting unclassified/unknown in which the machine learning model 220 may be configured with a label unclassified/unknown to indicate that the feature vectors (i.e., features) of the ticket do not apply to the IT environment or IT domain. By abstaining from classifying such tickets and/or by classifying such tickets that are not derived from and/or related to the IT environment as unclassified/unknown, the machine learning model 220 is configured to prevent a misclassified ticket from being incorrectly sent to the automated resolution system 222 and correspondingly having automated (faulty) corrective actions performed on the IT environment by the automated resolution system 222. For example, one or more software and/or hardware components in the IT environment can be automatically changed by an automated resolution system based on an incorrect classification label of a ticket, thereby resulting in a malfunction of software and/or hardware components of computer systems in the IT environment.

Figure 3:
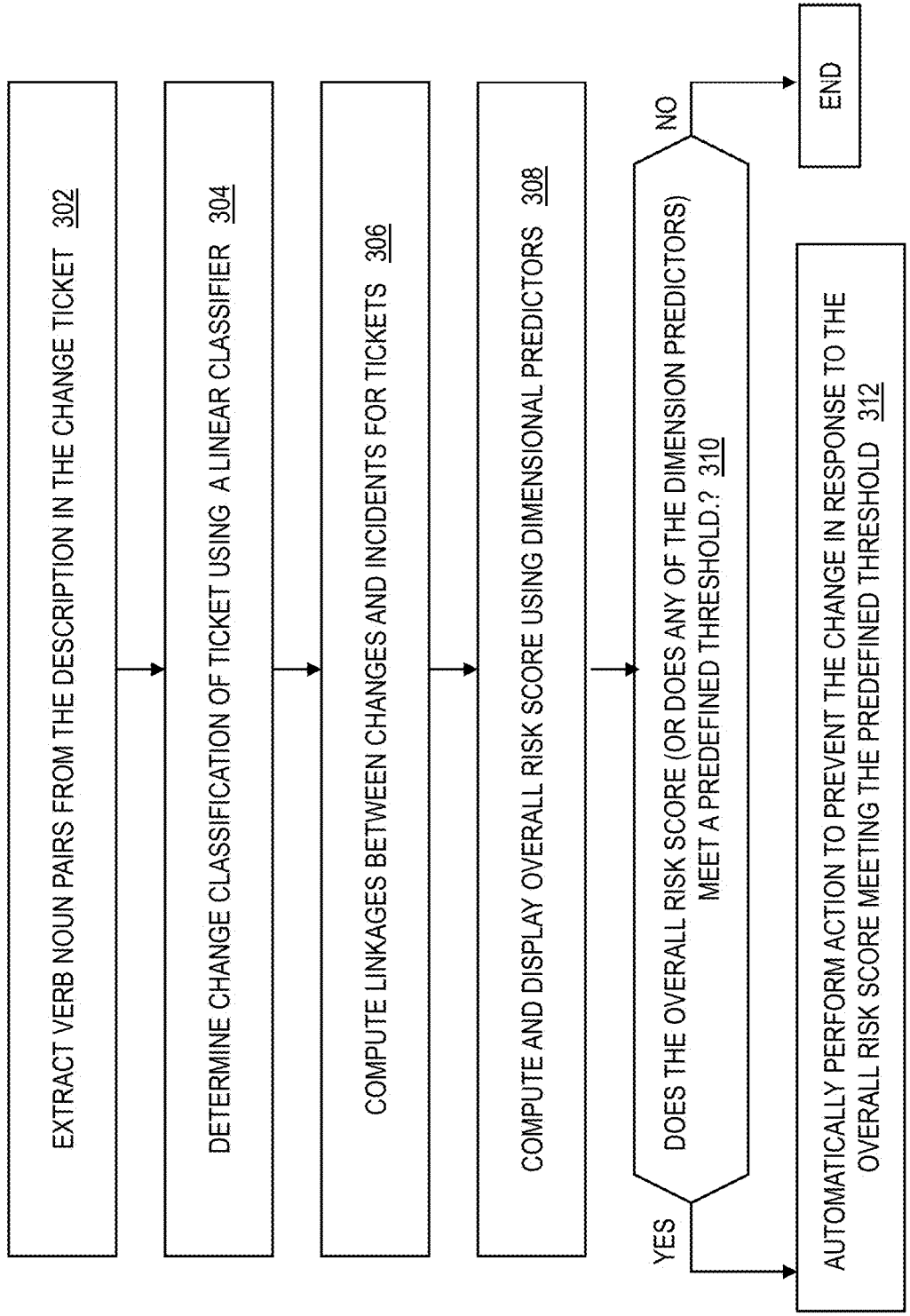
FIG. 3 is a flowchart of a computer-implemented method for providing self-learning automated information change risk prediction, thereby predicting IT change risk, according to one or more embodiments of the present invention.

FIG. 3 is a flowchart of a computer-implemented method 300 for providing self-learning automated information technology change risk prediction, thereby predicting IT change risk, according to one or more embodiments. The computer-implemented method 300 is executed by the computer system 202. A change ticket has been received by the computer system 202 in which the change ticket has a description of the change to be made in the IT environment. An IT professional can start the change on the computer system 202, which can be a change on any of the computer system including the computer system 202 and/or any of the computer systems 240A-240N. Similarly, the automated resolution system 222 can execute the change in the IT environment. The change ticket serves as a change request.

At block 302 of the computer-implemented method 300, the software application 204 is configured to extract verb noun pairs from the description in the change ticket. Using an ontology 230, the software application 204 is configured to parse the description of the change ticket for verbs and nouns in order to determine what type of change is being requested. The software application 204 is inferring and/or searching for the action associated with the change ticket. Example changes could be changing a password, modifying a software application, applying a patch, making a change to the database, etc. In one or more embodiments, the software application 204 can include, call, and/or cause the trained NLP model 228 to extract verb noun pairs from the description in the change ticket. In one or more embodiments, the software application 204 can include, call, and/or cause the rules-based algorithm 226 to extract verb noun pairs from the description in the change ticket.

The software application 204 is configured to determine the action associated with the change of the change ticket and perform a categorization or taxonomy for the change in the change ticket. The NLP model 228 and the rules-based algorithm 226 can include and/or access one or more ontologies 230. The ontology 230 incudes terms in the IT domain and corresponding relationships among the terms. The terms are in classes or taxonomies, where each class has relations to another class as discussed further herein.

Figure 4:
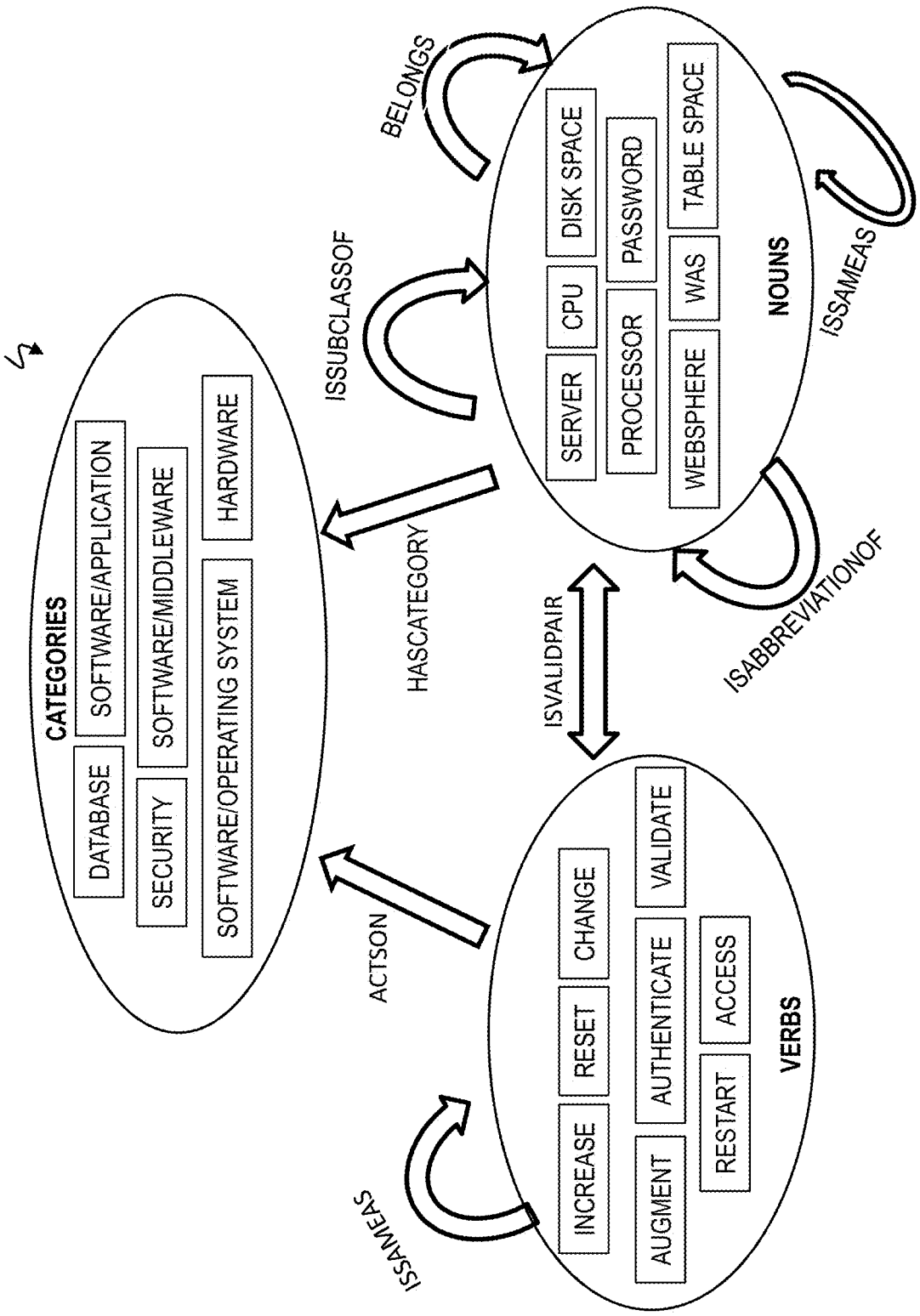
FIG. 4 depicts an example portion of an ontology in accordance with one or more embodiments of the present invention.
Figure 5:
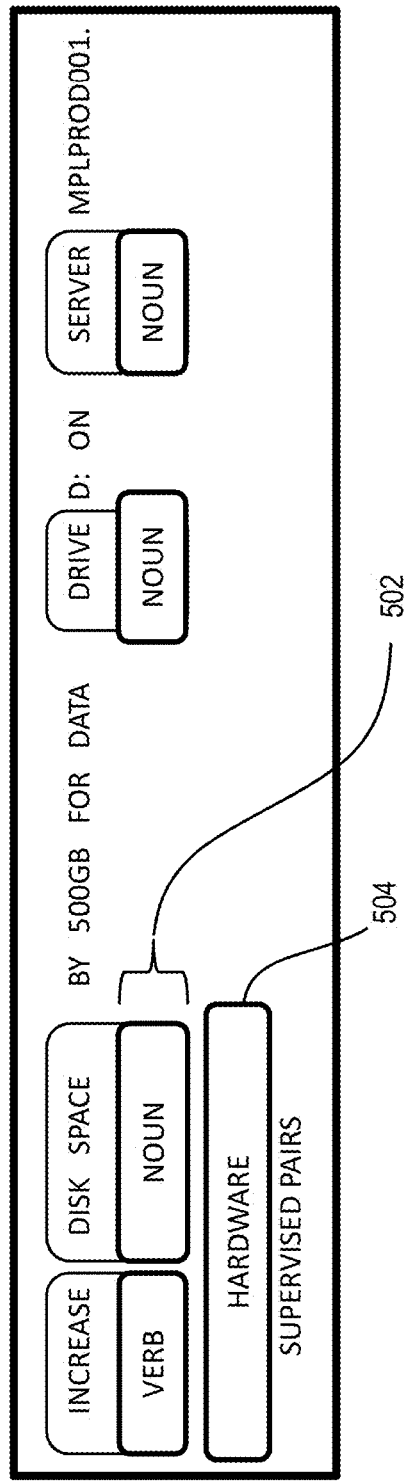
FIG. 5 depicts an example description for a change ticket in accordance with one or more embodiments of the present invention.

FIG. 4 depicts an example portion of the ontology 230 in accordance with one or more embodiments. The ontology 230 can be a supervised knowledge base of verb noun pairs in a hierarchical structure. In the example of FIG. 4, the ontology 230 includes classes or concepts, for example, such as categories, verbs, nouns, etc., and there are relations between the various classes/concepts. There are also relations between terms in one class and terms in another class. There are relations between terms within the same class. The NLP model 228 can parse the description of the ticket, and the NLP model 228 is trained to utilize the ontology 230 to find verb nouns pairs in the description of the ticket, along with a category for the change ticket. Particularly, the NLP model 228 can find the category for the verb noun pair. FIG. 5 depicts an example description for a change ticket along with processing of the change ticket. The software application 204, which may use the NLP model 228, has parsed the change ticket to determine verbs and nouns. The software application 204 has determined/identified a verb noun pair 502, for example, using the NLP model 228. For example, the verb noun pair 502 is determined from the unstructured text (including the abstract and description) associated with the change ticket using a supervised knowledge base of verb noun pairs in the ontology 230. Although FIG. 5 illustrates a simplistic example for ease of understanding, the verb is "increase", and the noun is "disk space" in the verb noun pair 502. Further, the software application 204 is configured to map the identified verb noun pair 502 into, for example, a second-level taxonomy of classes. For example, the software application 204 can map the verb noun pair 502 to a category 504 as the change classification of the ontology 230, which is, for example, the "hardware" category. In some embodiments, the software application 204 can determine the change classification/category using the ontology 230. In one or more embodiments, the NLP model 228 and/or a machine learning model 260 can be utilized to determine the change classification/category for the verb noun pair considered as the action for the change ticket.

Referring to FIG. 3, at block 304, the software application 204 is configured to determine the change classification/category of the change ticket using a classifier. This may be an example where the change classification/category was not previously determined and/or to confirm the previously determined change classification/category. The software application 204 can include, call, and/or cause the machine learning model 260 to classify the change ticket. In one or more embodiments, the machine learning model 260 includes a passive aggressive linear classifier as an algorithm. Using training data 221, the machine learning model 260 is trained on the descriptions of numerous change tickets, where the descriptions are labeled during the training phase. For example, as the training data 221, feature vectors are created from the terms in the descriptions of the change tickets, and each of the feature vectors of the respective change tickets is labeled with its change classification/category. For some of the training data 221, feature vectors are made from the verb noun pairs found in change tickets, for example, without the other terms; these features vectors containing the verb noun pairs are each labeled with a change classification/category as more focused training data 221. During the training process, the weights and/or coefficients of the passive aggressive linear classifier are changed. Using the labeled training data 221, the machine learning model 260 is trained to classify the change classification/category for each change ticket, thereby resulting in a trained machine learning model 260. Accordingly, during the inference phase when a change ticket is received, the machine learning model 260 determines the change classification using the description of the change ticket and/or using the verb noun pair.

At block 306, the software application 204 is configured to determine linkages between change requests for change tickets and incidents in incident tickets in the IT environment. This is a determination of a linkage when a change happens in the IT environment, and subsequently in time, there is an incident in the IT environment. As such, there can be a linkage between the change and the subsequent incident (i.e., problem). A linkage between a change request of a change ticket and an incident in an incident ticket can be identified using two mechanisms, which are (1) using an explicit mention as the linkage and (2) using change and incident similarity as the linkage.

For the explicit mention, if a change request identification (ID) of the change ticket is explicitly mentioned in the description of an incident ticket having an incident ID, the software application 204 is configured to identify this pair, which are the change request ID and the incident ID, as an explicit linkage. Each change ticket has a unique change request ID, while each incident ticket has a unique incident ID When there is not an explicit mention of the change request ID in the incident ticket, the software application 204 is configured to determine the change incident linkage using change and incident similarity. For example, if a change request and an incident ticket happen on the same host (e.g., the same machine) and the identified change action and incident symptom are the same, then the software application 204 is configured to create a change incident linkage. The software application 204 can include, call, and/or cause the machine learning model 220 to determine a similarity between change tickets and incident tickets. It is noted that any candidate change ticket has to occur and have its change executed in the IT environment prior to the incident ticket. A predefined window of time can be predetermined in advance for the amount of time prior to the timestamp of the incident ticket. Similar to the machine learning model 260, the machine learning model 220 is configured to classify the change requested in the candidate change ticket(s) with a classification label and to classify the incident ticket with a classification label. FIG. 6 depicts a block diagram of an example of classification similarities according to one or more embodiments. When analyzing the candidate change tickets within the predefined window, the machine learning model 220 is configured to determine the classification similarity for the group of change tickets. In FIG. 6, the change IDs of three candidate change tickets are CHG0001, CHG0002, and CHG0003, and each change ticket is determined, for example, to have the classification similarity "disk handler".

When analyzing one or more incident tickets that occur in time subsequent to the candidate change tickets, the machine learning model 220 is configured to determine the classification similarity for the incident tickets. In FIG. 6, the incident IDs of three example incident tickets are IN-ABCD-0001, IN-ABCD-0002, and IN-ABCD-0003, and each incident ticket is determined, for example, to have the classification similarity "disk handler".

In response to determining that the same classification similarity is for candidate change tickets and incident tickets, the software application 204 can parse the candidate change tickets to find the host name (e.g., host machine) and parse the incident tickets to find the host name. For matching hosts and corresponding classification similarities, the software application 204 is configured to determine that a candidate change ticket having its unique change ID has a linkage to the incident ticket having its unique incident ID. Taking the incident change ticket having the incident change ID IN-ABCD-0001 as an example, the software application 204 is configured to determine that both the change ticket having change ID CHG0001 and the incident change ticket having incident change ID IN-ABCD-0001 have the same classification similarity (e.g., disk handler) or an analogous classification similarity if the names are not exactly the same; also, the software application 204 is configured to determine that both the change ticket having change ID CHG0001 and the incident change ticket having incident change ID IN-ABCD-0001 have the same host (e.g., server X). Accordingly, the software application 204 is configured to determine that the change ticket having change ID CHG0001 and the incident change ticket having incident change ID IN-ABCD-0001 have a change incident linkage. By having the change incident linkage, there is a likelihood that the change in change ticket having change ID CHG0001 caused the problem/error for the incident change ticket having incident change ID IN-ABCD-0001. This allows the software application 204 to determine that the same type of change in a new change ticket has a risk of causing the same type of incident.

Referring to FIG. 3, at block 308, the software application 204 is configured to determine and display an overall risk score for a (potential) change using three dimensions of risk. The overall (failure) risk is the likelihood that a particular type of change is going to fail, i.e., not be successful. Listings and numberings are utilized for ease understanding and not for limitation. The three dimensions of risk are (A) failure risk, (B) major outage/incident risk, and (C) availability risk, and each of the three dimensions has dimension predictors.

Turning to (A) the failure risk dimension, the software application 204 is configured to determine the following dimensional predictors. In other words, failure rate is computed for each dimension predictor according to the type of change requested in a change ticket.

(1) Failure rate by change category or change type: this includes historic failure rates for changes belonging to a given change category. The change category can include a network change, a database change, change to a device, etc.

(2) Failure rate by owner group: this includes historic failure rates for changes belonging to a given owner group. The owner group can relate to a team, which could be based on the type of work performed by that team. The owner group can relate to different levels of expertise. The owner group can be based on a department, such as a department in a first geographical location, a second geographical location, etc.

(3) Failure rate for similar changes: this includes historic failure rates for similar changes (based on the change description). Similar changes can be clustered to determine if they have similar failure rates.

(4) Failure rate by configuration item(s): this includes historic failure rates for involved configuration items (CI). The configuration item can be a hostname, a mainframe cluster, a server, an application, etc. The configuration item can be one device or many devices.

Turning to (B) the major outage/incident risk dimension, the software application 204 is configured to determine the following dimension predictors. An incident rate is computed for each dimension predictor.

(5) Incident rate by change category: this includes historic incident rates for changes belonging to a given category.

(6) Incident rate by owner: this includes historic incident rates for changes belonging to a given owner group.

(7) Incident rate for similar changes: this includes historic incident rates for similar changes (based on change description).

(8) Incident rate by configuration item(s): this includes historic incident rates for involved CI (e.g., hostname, mainframe cluster, etc.).

Turning to (C) availability risk dimension, the software application 204 is configured to determine the following dimensional predictors.

(9) Mean time between failures (MTBF) on devices involved. The $$MTBF = \frac{\text{Total Working Time} - \text{Total Breakdown Time}}{\text{Number of Breakdowns}}.$$

(10) Mean time to resolve (MTTR) issues on devices involved. MTTR is the average time it takes to resolve an identified issue on a device.

A change risk score, a device availability score, and an overall risk score are determined, and their respective equations are provided below.

Change risk score: the change risk score for a change request is estimated as a linear combination of multiple risk factors as depicted in Equations 1, 2, and 3 below, and then an average risk of a change is expressed in Equation 4.

$$f_c^i = \frac{\text{changes in the } i^{(th)} \text{ notion of similarity}}{\text{Total number of changes}} \quad \text{Eq. 1}$$

$$f_F = \frac{\text{changes that cause failure}}{\text{Total number of changes}} \quad \text{Eq. 2}$$

$$f_I = \frac{\text{changes that cause generation of incident - tickets}}{\text{Total number of changes}} \quad \text{Eq. 3}$$

Then,

Average Risk of a Change = $\quad$ Eq. 4

$$p_c = \sum_{i \in \left\{\substack{\text{Four Notions} \\ \text{of Similarity}}\right\}} f_c^i \times \min[1, (f_I + f_F)]$$

These risk factors are based on the four notions of similarity between change requests, which are (a) change requests that are classified in the same category/class, (b) change requests that are assigned to the same resolver group, (c) change requests that target the same host/device, and (d) change requests that are similar to other changes based on the change description. For each such notion of similarity, the software application 204 is configured to estimate the risk by measuring the fraction of similar changes that have either: (a) failed changes and/or (b) changes that caused incidents/outages. The higher this fraction, the higher the risk of this change request.

The device availability score: the device availability score in Equation 5 is determined by the ratio of MTBF to the sum of MTBF and MTTR, representing the reliability and repair efficiency of the device. This device availability score provides a relative measure of how often the device is available for use, considering both the time between failures and the time required to resolve any issues.

$$\text{Availibility of a device } d = p_a^d = \frac{MTBF_d}{MTBF_d + MTTR_d} \quad \text{Eq. 5}$$

where, $MTBF_d$ and $MTTR_d$ are the Mean time Between Failure and Mean Time To Recover/Repair, respectively, of a device d.

MTBF (mean time between failures) is the average time between fixable problems happening to a device, application, or service. MTBF helps one to measure how often the device needs repair and how dependable the device is. If the time between failures is longer, this means the device/system is more reliable. MTTR (mean time to repair) represents the average time required to repair the device after a failure occurs. MTTR measures the efficiency of the resolution process and how quickly the device can be restored to a functional state. A higher device availability score indicates that the device spends more time functioning properly and less time being out of service due to failures. The device availability score reflects a more reliable and accessible device, desirable in various contexts, where system downtime can be costly or where critical services should have uninterrupted availability.

Overall change risk score: the overall risk of a change deployed on a device in Equation 7 is then estimated as a combination of the device availability (score) and the change risk (score). The device availability is the fraction of the time the device is up and/or available for operation. The lower the device availability, the higher the device's intrinsic risk (or failure). Even when the device is available, the change can make it unavailable due to a failure.

If device failure and failures caused by changes are independent of each other, the software application 204 can compute the overall probability of availability of a device d as:

$$\text{Overall Availibility of device} = p_o^d = p_a^d(1 - p_c) \quad \text{Eq. 6}$$

The means the overall risk of device unavailability is expressed as the following.

Overall risk = $\quad$ Eq. 7

$$1 - p_o^d = 1 - p_a^d(1 - p_c) = 1 - p_a^d + p_a^d p_c = \frac{MTTR_d + MTBF_d \times p_c}{MTTR_d + MTBF_d}$$

Thus, the overall risk is calculated from the device availability and change risk as shown in the Equation 7.

Now turning to an example graphical user interface, FIG. 7 depicts a portion of an example display screen illustrating the overall risk score for the change to the IT environment according to one or more embodiments. FIG. 7 also illustrates dimension predictors for (A) the failure risk. As displayed on the display 119, the typical assessment may determine that the risk is minor as illustrated in the box 712. However, the software application 204 has determined that the overall risk score is critical as illustrated in the box 710 according to one or more embodiments. Further, the software application 204 is configured to generate and display an explanation 720 as the explanation for the overall risk score in accordance with one or more embodiments. Additionally, the software application 204 is configured to generate and display dimension explanations 722 as further explanations of risk individual dimension predictors. The dimension predictors can have a rating depicted as risk rating 724, and one or more or the ratings may meet a predefined threshold that requires further action. For example, a rating of extremely high or even high can be considered at meeting the predefined threshold in the risk rating 724. The predefined threshold can be preset by a user. The rating of low, medium, high, and extremely high can be based on numerical values.

FIG. 8 depicts a portion of an example display screen illustrating dimension predictors for (B) the major outage/incident risk for the change to the IT environment according to one or more embodiments.

Referring to FIG. 3, at block 310, the software application 204 is configured to check whether the overall risk score meets a predefined threshold or optionally whether a value for any one of the dimension predictors meets a predefined threshold. If not ("No"), the flow ends.

At block 312, when the predefined threshold for the overall risk score is met and/or when the predefined threshold for one of the dimension predictors is met for a change ticket, the software application 204 is configured to automatically perform an action to prevent the change to the IT environment from occurring. In some examples, the automated resolution system 222 can be in the process of executing the change in the change ticket, and/or the automated resolution system 222 has initiated the process. In some example, the IT professional can be in the process of executing the change in the change ticket, and/or the IT professional has initiated the process. In one or more embodiments, the software application 204 can cause a display box to overlay the display screen of the display 119 on which the IT professional wishes to initiate the change to the IT environment, and the display box requires the IT profession to make a selection (e.g., using a mouse, keyboard, etc.) on the display screen acknowledging the change risk before permitting the change to the IT environment. After the acknowledgement, which could be selecting a button, the display box is removed to allow the IT professional to initiate the change and/or to allow the automated resolution system 222 to perform the change.

In one or more embodiments, the software application 204 can cause a display box to overlay the display screen of the display 119 in which the display box requires the IT professional to perform further review of the potential changes before permitting the change to the IT environment. Performing further review could include scrolling through display screens related to the change. After the acknowledgement of performing further review of the potential changes, which could be selecting a button, the display box is removed to allow the IT professional to initiate the change and/or to allow the automated resolution system 222 to perform the change.

In one or more embodiments, the software application 204 can cause a display box to overlay the display screen of the display 119 in which the display box requires the IT professional to generate a backup copy of the data including images on a separate computer system that is not affected by the change. The display box could further require the IT professional to enter the file location of the backup copy before the software application 204 removes the screen. After the acknowledgement of performing the backup copy, which could be selecting a button along with entering the file location of the backup copy, the display box is removed to allow the IT professional to initiate the change and/or to allow the automated resolution system 222 to perform the change.

In one or more embodiments, the software application 204 can cause a display box to overlay the display screen of the display 119 in which the display box requires the IT professional to create a separate communication channel (e.g., between two devices such as between two servers in a storage area network (SAN)) as an alternative to any communication channel being changed in the IT environment. After the acknowledgement of performing the backup copy, which could be selecting a button along with entering the name of a switch or port of the alternative communication channel, the display box is removed to allow the IT professional to initiate the change and/or to allow the automated resolution system 222 to perform the change.

In one or more embodiments, the software application 204 can cause a display box to overlay the display screen of the display 119 in which the display box requires the IT professional to select a button associated with the display box. The display box disables the display screen of the display 119 such that the IT professional and/or the automated resolution system 222 are prevented from executing the change in the IT environment. After selecting the button, the IT professional can execute the change and/or the automated resolution system 222 can execute the change in the IT environment.

It is noted that the change of the change ticket is executed in the IT environment after the action is resolved that previously prevented the change for starting or continuing.

FIG. 9 is a flowchart of a computer-implemented method 900 for providing self-learning automated information technology change risk prediction for a change to the IT environment, providing notification that the change to the IT environment meets a risk threshold, and preventing the change from being performed based on the change risk meeting a risk threshold, thereby requiring receipt of further actions taken by the IT professional according to one or more embodiments. The computer-implemented method 900 is executed by the computer system 202.

At block 902, the software application 204 executed on the computer system 202 is configured to receive a change request (e.g., a change ticket) that is input to a first machine learning model, the first machine learning model determining at least one word pair in the change request, the change request being a modification in an information technology environment. In one or more embodiments, the first machine learning model can be the NLP model 228. In one or more embodiments, the rules-based algorithm 226 can be utilized.

At block 904, the software application 204 is configured to classify the at least one word pair into a change category for the IT environment using a second machine learning model, the change category identifying a type of the modification to be executed in the IT environment. In one or more embodiments, the second machine learning model can be implemented as the machine learning model 260. In one or more embodiments, second machine learning model can also be implemented as the NLP model 228.

At block 906, the software application 204 is configured to determine a likelihood (e.g., a probability) of causing a problem in the IT environment as a result of executing the modification. In one or more embodiments, the likelihood of causing the problem can be that the overall risk score meets a predefined threshold. In one or more embodiments, the likelihood can be (A) the failure risk dimension having a given dimension predictor that meets a predefined threshold, where the dimension predictors include (1) failure rate by change category or change type, (2) failure rate by owner group, (3) failure rate for similar changes, (4) failure rate by configuration items. In one or more embodiments, the likelihood can be (B) the major outage/incident risk dimension having a given dimension predictor that meets a predefined threshold, where the dimension predictors include (5) incident rate by change category, (6) incident rate by owner, (7) incident rate for similar changes, and (8) incident rate by configuration items. The likelihood could include any combination of (A) the failure risk dimension, (B) the major outage/incident risk dimension, and/or the (C) availability risk dimension.

At block 908, the software application 204 is configured to automatically perform an action to prevent the modification of the change request in the IT environment, thereby protecting the computer systems, such as the computer systems 202 240A, 240B, and 240N, in the IT environment. This improves the functioning of the computer system itself by preventing or avoiding errors, malfunctions, bugs, viruses, data corruption, malware, etc., because of erroneous changes to the IT environment.

Further, the first machine learning model (e.g., the NLP model 228 or the rules-based algorithm 226 can be utilized) uses an ontology 230 to determine the at least one word pair (e.g., verb noun pair), the ontology 230 comprising a knowledge base of IT concepts and relations among the concepts. The second machine learning model (e.g., machine learning model 260) is trained on training data 221 of change tickets for the IT environment in order to learn to classify the change tickets into change categories.

The likelihood of causing the problem in the IT environment relates to a score (e.g., the overall risk score) that denotes a severity of the risk in making the change to the IT environment. Determining the likelihood of causing the problem in the IT environment is based on a failure risk dimension, a major incident risk dimension, and an availability risk dimension.

As caused by or executed by the software application 204, automatically performing the action to prevent the modification of the change request in the IT environment includes disabling input to a display screen displayed on the display 119 by requesting user input associated with a display box, in response to the likelihood of causing the problem in the IT environment meeting a predefined threshold. The predefined threshold is user configurable, and disabling the input to the display screen prevents the problem from occurring in the IT environment.

Figure 10:
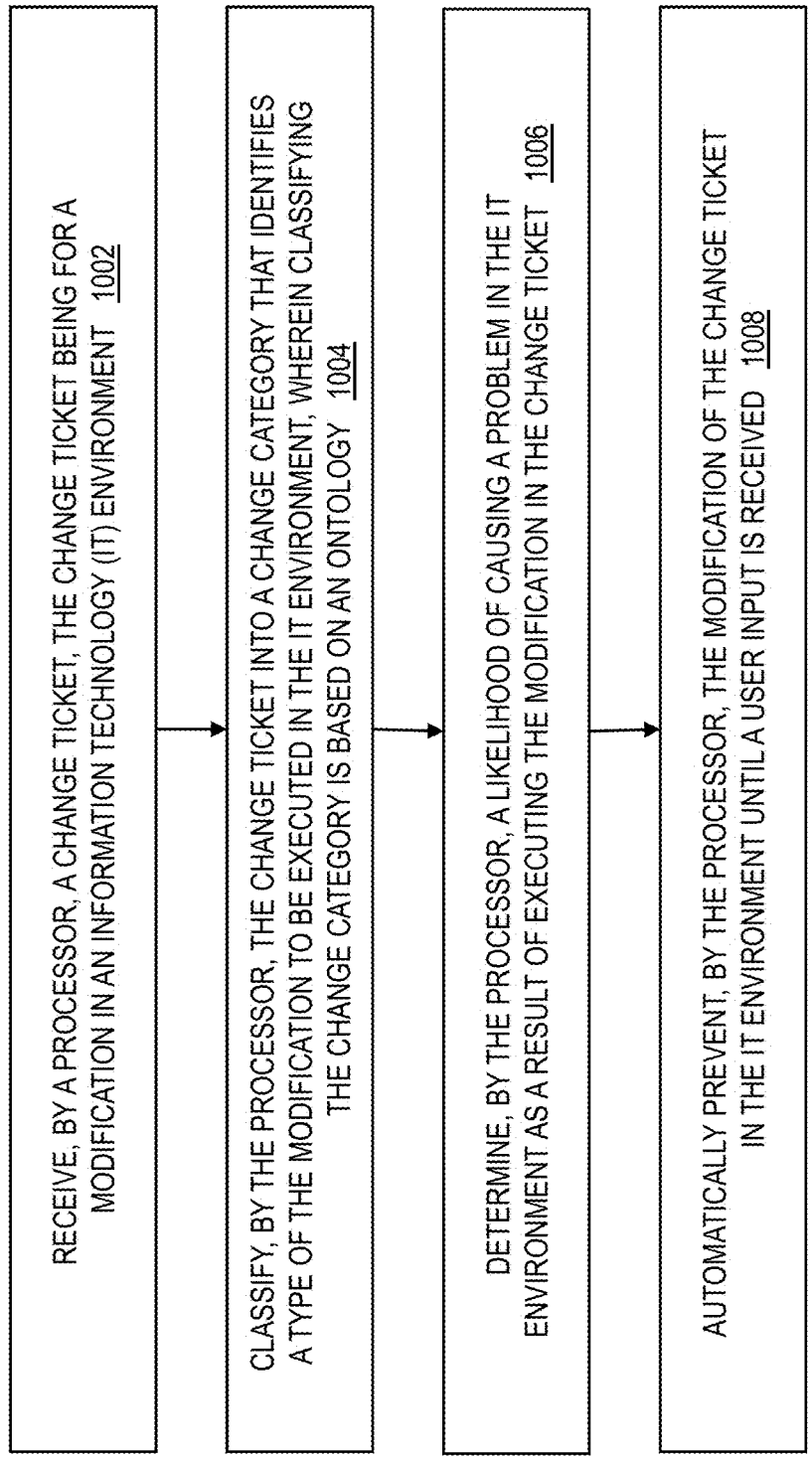
FIG. 10 is a flowchart of a computer-implemented method for providing self-learning automated information technology change risk prediction for a change to the IT environment and preventing the change from being performed based on a change risk meeting a risk threshold according to one or more embodiments of the present invention.

FIG. 10 is a flowchart of a computer-implemented method 1000 for providing self-learning automated information technology change risk prediction for a change to the IT environment, providing notification that the change to the IT environment meets a risk threshold, and preventing the change from being performed based on the change risk meeting a risk threshold, thereby requiring receipt of further actions taken by the IT professional according to one or more embodiments. The computer-implemented method 1000 is executed by the computer system 202.

At block 1002, the software application 204 executed on computer system 202 is configured to receive a change ticket, the change ticket being for a modification in an information technology environment.

At block 1004, the software application 204 is configured to classify the change ticket into a change category that identifies a type of the modification to be executed in the IT environment, where classifying the change category is based on an ontology 230.

At block 1006, the software application 204 is configured to determine a likelihood of causing a problem in the IT environment as a result of executing the modification in the change ticket.

At block 1008, the software application 204 is configured to automatically prevent the modification of the change ticket in the IT environment until a user input is received.

Automatically preventing the modification of the change ticket in the IT environment until the user input is received includes stopping an automatic resolution system 222 from executing the modification of the change ticket. Automatically preventing the modification of the change ticket in the IT environment until the user input is received includes disabling input to a display screen of the display 119 by requesting the user input associated with a display box.

FIG. 11 is a flowchart of a computer-implemented method 1100 for training the machine learning model 220 having a linear classification algorithm for each classification label, resulting in the trained machine learning model 220, according to one or more embodiments. The computer-implemented method 1100 is executed by the computer system 202.

At block 1102 of the computer-implemented method 300, the software application 204 is configured to retrieve training data by compiling the data from each ticket into training data that is stored in the training data 206. The software application 204 can be configured to parse the training data 206 to determine and filter out any tickets along with their resolutions that do not belong in the IT environment. This leaves only tickets that are in the IT environment, which denote the IT domain, such that the machine learning model 220 is trained on and learns tickets and their respective resolutions that belong in the IT domain. In one or more embodiments, for example, the machine learning model 220 is only trained on and learns tickets and their respective resolutions that belong in the IT domain. Upon detecting a ticket that is not in the IT domain, machine learning model 220 abstains for labeling the ticket and/or this ticket may be labeled unclassified/unknown; as such, the ticket is prevented/blocked from being processed by the automated resolution system 222.

The training data 206 can be refined using cross-fold validations. For the training data 206, the tickets are labeled in preparation for training the machine learning model 220. For training data 206, the labels can be automation playbooks obtained by reconciling automation executions and the incident tickets being addressed. For example, the machine learning model 220 may be trained on tickets resolved by an automation platform (e.g., IT management system 244) such as, for example, Red Hat® Ansible® platform, and trained on tickets that have not been resolved by the automation platform. For example, when the automation platform (e.g., IT management system 244) receives a ticket, it will log into the system; if it has a playbook, the automation platform executes the playbook, resolves the ticket, and closes the ticket. A closed ticket is considered a fact or completed. The ticket (e.g., the change tickets and incident tickets) is utilized to train the machine learning model 220 into one of the known example classes (e.g., NLP similarities) in the IT domain such as, for example, application down, database space issue, disk handler, network connectivity, file system mount handler, high disk space usage handler, high memory and page file usage, host down handler, service handler, job abends, etc. It should be appreciated that that the example list of classification labels is not meant to be exhaustive, and the classification labels can be utilized for classification similarities and change classifications/categories.

At block 1104, the software application 204 is configured to train the machine learning model 220 using the training data 206. For example, the data of each ticket (along with its corresponding label) is input to the machine learning model 220 as feature vectors, in order for the linear classifier algorithm of the machine learning model 220 to learn how to classify the input data of the ticket. The training data is labeled, which means that the tickets are labeled in advance to determine when the output of the machine learning model 220 predicts the correct label. During the training phase, the predicted labels of the tickets from the machine learning model 220 are compared to labels of the tickets in the training data 206 to continuously improve the machine learning model 220. This allows the machine learning model 220 to learn the correct classification label for each ticket.

At block 1106, the machine learning model 220 is configured to classify the input data of the tickets with explanations. For example, each ticket is classified based on an underpinning and/or decision made by the machine learning model 220. The machine learning model 220 is configured generate an explanation to the user of a machine learning rule and/or as pertinent positive features on which the machine learning model 220 based its decision for the predicted label of the input ticket. In one or more embodiments, the machine learning model 220 may include and/or employ a rule generation algorithm 224 for the machine learning rule and/or the identified pertinent positive features, and further details are discussed herein.

At block 1108, the software application 204 is configured to validate the classification results by comparing the predicted classification label of the ticket to the label of the ticket in the training data. At block 1110, the software application 204 is configured to check if the predicted classification label of the ticket matches the label of the ticket in the training data.

At block 1112, if ("Yes") there is a match, the software application 204 is configured to check if the explanation of the machine learning rule and/or the identified pertinent positive features is satisfactory. This may involve asking a subject matter expert for input and/or employing a natural language processor (NLP) system. If ("Yes") the explanations are satisfactory, the software application 204 is configured to end training the machine learning model.

At block 1114, when ("No") the classification results are not satisfactory for the decision at block 310, the software application 204 is configured to improve the training data and/or tune the classifier algorithm. Also, when ("No") the explanations are not satisfactory for the decision at block 312, the software application 204 is configured to improve the explanations.

It is noted that a separate linear classification algorithm may be trained for each classification label. In one or more embodiments, the machine learning model 220 can include numerous linear classification algorithms, one for each classification label corresponding to the IT domain. In one or more embodiments, there can be numerous machine learning models 220, one for each classification label corresponding to the IT domain. Any discussion of a single linear classification algorithm and/or single machine learning model 220 applies by analogy to all linear classification algorithms and/or all machine learning models 220 corresponding to all the classification labels of the IT domain.

As noted herein, when the input ticket indicates "First human in space was in 1961" for a typical classifier, the typical classifier will attempt to classify the ticket with a label such as, for example, disk or disk handler. However, such a label is a misclassification in this example, which can lead to incorrect actions being taken by an automated resolution system.

As technical benefits and solutions, one or more embodiments are configured to abstain from classifying such a ticket indicating the "First human in space was in 1961" because the machine learning model 220 has been trained to abstain from classifying such a ticket. Rather, the machine learning model 220 may output unknown/unclassified, thereby preventing the automated resolution system 222 from modifying one or more software and/or hardware components in an IT environment of a client in an industry. Accordingly, based on the output from the machine learning model 220, the software application 204 can recognize that the ticket is unknown/unclassified in the IT domain and send the ticket to the IT department for resolution, instead of sending the ticket to the automated resolution system 222. The software application 204 is configured to send the tickets that have been properly labeled by the machine learning model 220 to the automated resolution system 222 for automated processing in the IT environment of the client in the industry. In accordance with the label from the machine learning model 220, the automated resolution system 222 is configured to modify software components, hardware components, and/or both software and hardware components of one or more computer systems in the IT environment, thereby resulting in improvements to the computer systems themselves. The modifications to the software and/or hardware components solve technical computer problems on the computer systems in the IT environment and are practical applications associated with use of the machine learning model 220.

One or more embodiments provide techniques for computing pertinent positive features in a ticket for text classification. The pertinent positive features are tokens in a ticket. Tokens can refer to one or more words, phrases, sentences, etc., in the text of a ticket, and the process if referred to as tokenization. The tokens can be utilized as features in the feature vector of a ticket. One or more embodiments extract a list of all pertinent positive features for all (IT) tickets, along with their labels, which can be utilized to further train the machine learning model 220 and for explanations as discussed herein.

Further, one or more embodiments are configured to generate a liner classifier for the machine learning model 220, generate a coefficient matrix and confusion matrix for insights into how the linear classifier works at a corpus level, use gradient descent iterative threshold shrinkage to extract the pertinent positives for all IT tickets, curate the pertinent positives with subject matter expert/IT domain expert to find "true" pertinent positives, extract rules and rule features as new training data sets for a given label, and create an enriched training model and a list of the universe of allowed pertinent positives. Accordingly, one or more embodiments can receive an incoming new incident ticket, extract the pertinent positives for a given ticket, and if any pertinent positives are not identified, the linear classifier abstains from classifying the ticket.

Figure 12A:
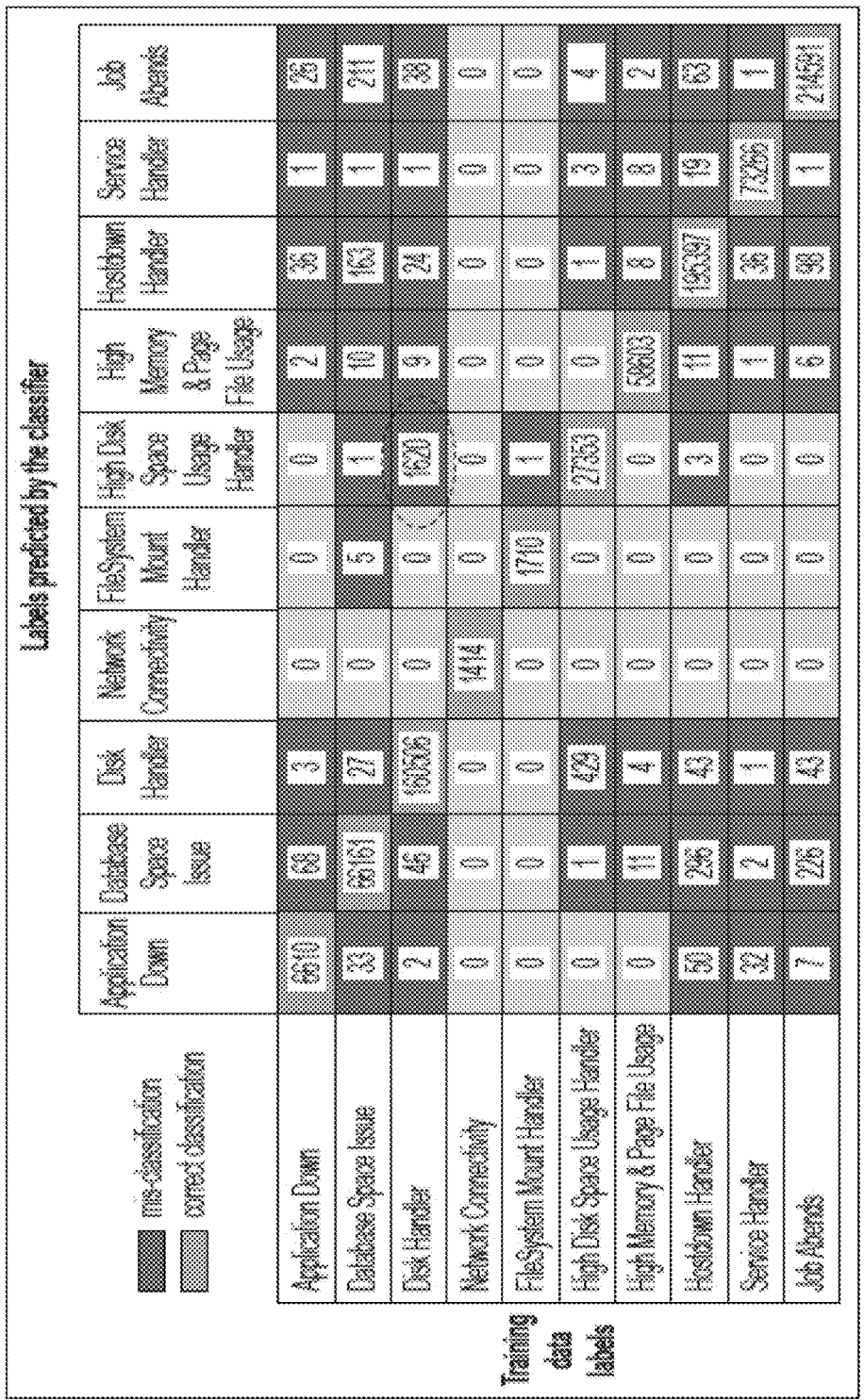
FIG. 12A depicts a block diagram illustrating an example confusion matrix of the machine learning model according to one or more embodiments of the present invention.

Referring to FIG. 12A, a block diagram depicts an example confusion matrix of the machine learning model according to one or more embodiments. FIG. 12B depicts a block diagram of an example coefficient matrix of the machine learning model according to one or more embodiments. The features of the tickets and labels of the confusion matrix in FIG. 12A are projected into the example coefficient matrix depicted in FIG. 12B.

To learn from mistakes, by probing the machine learning model 220, the software application 204 can generate the example confusion matrix that captures how the classifier gets confused in learning and classifying the training data in FIG. 12A. A confusion matrix is an N×N matrix used for evaluating the performance of a classification model, where N is the number of target classes. The matrix compares the actual target values in the training data 206 with those predicted by the machine learning model.

Referring to FIG. 12B, the coefficient matrix includes entries that represent signed coefficients of respective features for the hyperplanes in the binary linear classifiers for respective classes. The software application 204 is configured to identify features with the largest absolute coefficients (values). Using the coefficient matrix, this provides the software application 204 with the most influential features for classification at a global level. The coefficient matrix, sometimes called a correlation matrix, is a table that displays the correlation coefficients for different variables. The coefficient matrix depicts the correlation between all the possible pairs of values in a table. It summarizes a large dataset and identifies and visualizes patterns in the given data.

In FIG. 12B, the features having a positive number in a given classification label indicate that the corresponding features are positively contributing to the decision of the machine learning model 220 for classification into the given classification label. On the other hand, features having a negative number (i.e., negative sign) for a given class label indicate that the corresponding features are not contributing (i.e., negative contribution) to classification into the given class label.

Based on all of the features in tickets (e.g., in training data 206) for all class labels, the software application 204 using the machine learning model 220 generates a universe of pertinent positive features for each predicted classification label as depicted in FIG. 13A. In FIG. 13A, the example chart shows the pertinent positive features, also referred to as pertinent positives, which are determined to positively contribute to each of the predicted labels during the classification by the machine learning model 220. For example, the pertinent positive features of "low space", "disk: c handler", and "file system" are the pertinent positive features that positively contribute to the predicted classification label "disk handler" in the classification by the machine learning model 220. The example classification label disk handler is utilized in various example scenarios for explanation purposes and not limitations. It should be appreciated that embodiments are not limited to the classification label disk handler.

FIG. 13B is a chart illustrating how the example feature "space" contributes to the determination of classification labels. As can be seen in FIG. 13B, the feature space has a positive coefficient for the classification label disk handler, which means that the feature space positively contributes to the decision of the machine learning model 220 to output the classification label disk handler. Similarly, the feature space has negative coefficient for some other classification labels, which means that the feature space negatively contributes or does not influence the decision of the machine learning model 220 to output the corresponding class label; as such, the feature space can be identified as a pertinent negative feature and removed as a feature for the corresponding classification labels, in which space has a negative coefficient. The software application 204 continues feature removal for any features identified has pertinent negative features that have a negative coefficient for a given classification label, thereby leaving only the pertinent positive features that can be utilized in the universe of pertinent positive features for respective classification labels as depicted in FIG. 13A.

Figure 13C:
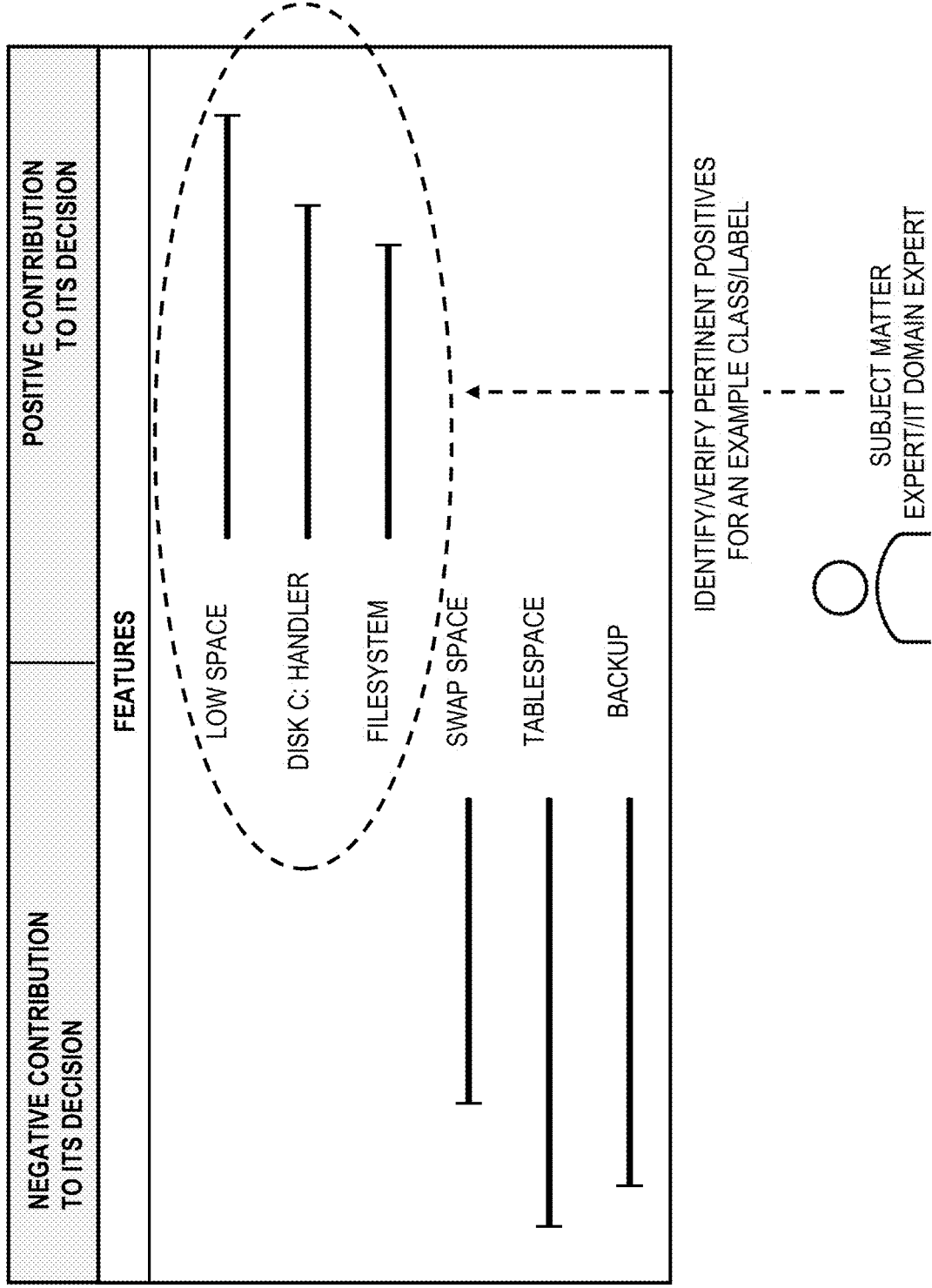
FIG. 13C depicts a graph illustrating the contributions of features that are analyzed by the machine learning model for determining a classification according to one or more embodiments of the present invention.

Continuing with the example scenario for the classification label disk handler, FIG. 13C is a graph illustrating the contributions of features that have been analyzed by the machine learning model 220 to make its classification of disk handler, which are now being verified by a human subject matter expert. For each feature, the graph shows its negative contribution to the decision and the positive contribution to the decision by the machine learning model 220 to classify a ticket with the label disk handler. The software application 204 identifies the pertinent positive features for a given class for verification by a subject matter expert, who confirms the pertinent positives features of, for example, "low space", "disk c: handler", and "file system" as positively contributing to the decision of the machine learning model 220. As identified by the software application 204, the subject matter expert confirms that all the pertinent positive features are true pertinent positive features for their respective classification labels, resulting in the universe of pertinent positive features for their labels as depicted in FIG. 13A. In one or more embodiments, the universe of pertinent positive features excludes any pertinent negative features. Accordingly, the (verified) pertinent positive features for their respective classification labels are collected and added to the training data 206 as new training datasets in the training data 206 for further training the machine learning model 220 to classify tickets with a classification label. This additional training further refines the ability of the machine learning model 220 to learn to abstain from classifying tickets that are not in the IT domain and improves the accuracy of the machine learning model 220.

During the inference phase, when the machine learning model 220 receives a ticket and outputs its classification label, the software application 204 can probe the machine learning model 220 to obtain the pertinent positive features for any ticket. Also, for an incoming ticket, the machine learning model 220 learns to extract and recognize the pertinent positive features for the given ticket, and when there are no pertinent positive features found in the ticket, the machine learning model 220 is configured to abstain from classifying the ticket. On the other hand, when the pertinent positive features are recognized in the ticket, the machine learning model 220 is configured to classify the ticket, highlight the pertinent positive features for display (on display 119) to the user, and extract the classifier rules using the disjunctive normal form to explain the machine learning model decision.

Figure 14:
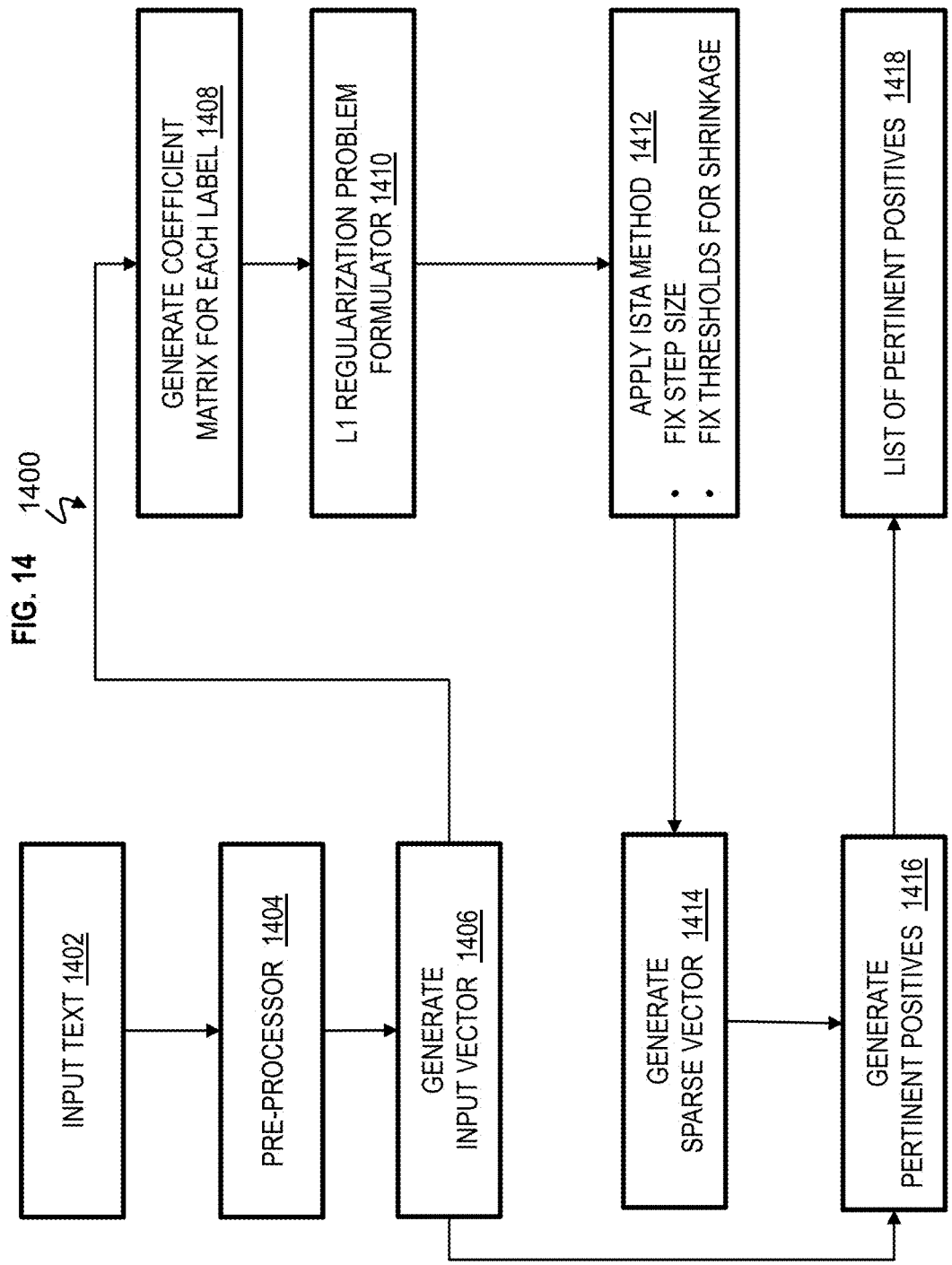
FIG. 14 is a flowchart of a computer-implemented method for computing pertinent positive features for classification according to one or more embodiments of the present invention.

FIG. 14 is a flowchart of a computer-implemented method 1400 for computing pertinent positive features for text classification according to one or more embodiments. In one or more embodiments, the software application 204 employs, utilizes, and/or is integrated with the machine learning model 220 to execute the computer-implemented method 1400. Further, the software application 204 may be utilized to probe the machine learning model 220 to perform the computer-implemented method 1400.

At blocks 1402, 1404, 1406, the software application 204 is configured to input text of an incident ticket to a pre-processor in order to generate a feature vector from the input text. The pre-processor extracts input features from the text, and the features are formed into a feature vector. A known technique can be utilized for conversion of the text into a feature vector. The feature vector is input to the machine learning model 220, which outputs a classification label for the corresponding ticket.

At block 1408, the software application 204 is configured to build a confusion matrix and generate a coefficient matrix for each label output by the machine learning model 220. An example confusion matrix and coefficient matrix are respectively illustrated in FIGS. 12A and 12B.

At block 1410, the software application 204 is configured to feed the feature vector and coefficient matrix to an L1 (and/or L2) regularization problem that models the pertinent positives. An example regression model that uses the L1 regularization technique is called the least absolute shrinkage and selection operator (lasso) regression, and an example regression model that uses the L2 regularization technique is called ridge regression. For L1 regularization, the lasso regression adds an "absolute value of magnitude" of coefficient as penalty term to the loss function. L1 regularization may be the choice when there are a high number of features as it provides sparse solutions. For L2 regularization, the ridge regression adds a "squared magnitude" of coefficient as a penalty term to the loss function. L2 regression can be used to estimate the significance of predictors and based on that it can penalize the insignificant predictors. Additionally, an elastic net is when L1 and L2 regularization combine together, and the combination becomes the elastic net method, which adds a hyperparameter.

At block 1412, the software application 204 is configured to apply an iterative shrinkage/thresholding algorithm (ISTA) to the L1 (and/or L2) regulation problem. The ISTA is widely used in solving linear inverse problems because of its simplicity. The ISTA may include gradient descent interactive threshold shrinkage.

At blocks 1414 and 1416, the software application 204 is configured generate a sparse feature vector by using ISTA method and select pertinent positive features from the sparse feature vector. The sparse feature vector for the classification label has fewer features than the (original) feature vector. Accordingly, using all the sparse feature vectors generated for the respective classification labels in the IT domain, the software application 204 selects the features for each classification label to generate a list of pertinent positive features for each class label, which are output at block 1418. As noted above, FIG. 13A represents a universe of pertinent positive features for each classification label, such as the example class label disk handler.

To further illustrate computing pertinent positive features for text classification, the following is an example scenario for explanation purposes and not limitation. ISTA algorithms are used to compute sparse solutions to inverse linear problems. A typical example of an inverse linear problem is linear regression. An example to consider is a classification problem, for example, the text classification problem. One can use any linear classification algorithm for a text classification problem in the IT ticket management domain. Now, consider a ticket T that gets classified into a class C (e.g., "disk handler") using a linear classification algorithm of the machine learning model 220. It is often beneficial to show "evidence" of the inner working of the classifier (e.g., machine learning model 220) and "explain" why ticket T was classified into class C. The pertinent positives in a ticket like T are a small subset of features of T that are responsible for its classification into class C. Such a set of features provides a good explanation of the inner working of the classifier according to one or more embodiments. As discussed in the example above, the disclosure formulates the problem of finding positive pertinent features for the text classification problem as a sparse inverse linear problem. One or more embodiments customize and simplify the ISTA algorithm to make it efficient for this use case. This customization considers the specific problem formulation that, for example, a passive aggressive classifier (PAC) uses internally and uses its structural properties to implement the iterative thresholding step efficiently.

In one or more embodiments, the machine learning model 220, rule generation algorithm 224, NLP model 228, and/or machine learning model 260 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., a change ticket having a change request and/or an incident ticket of a technical computer problem) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206, training data 221) can be utilized to train the machine learning algorithms. The training datasets can include historical data of past tickets and the corresponding options/suggestions/resolutions/classification and change categories/verb noun pairs/etc. provided for the respective tickets. Labels of can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
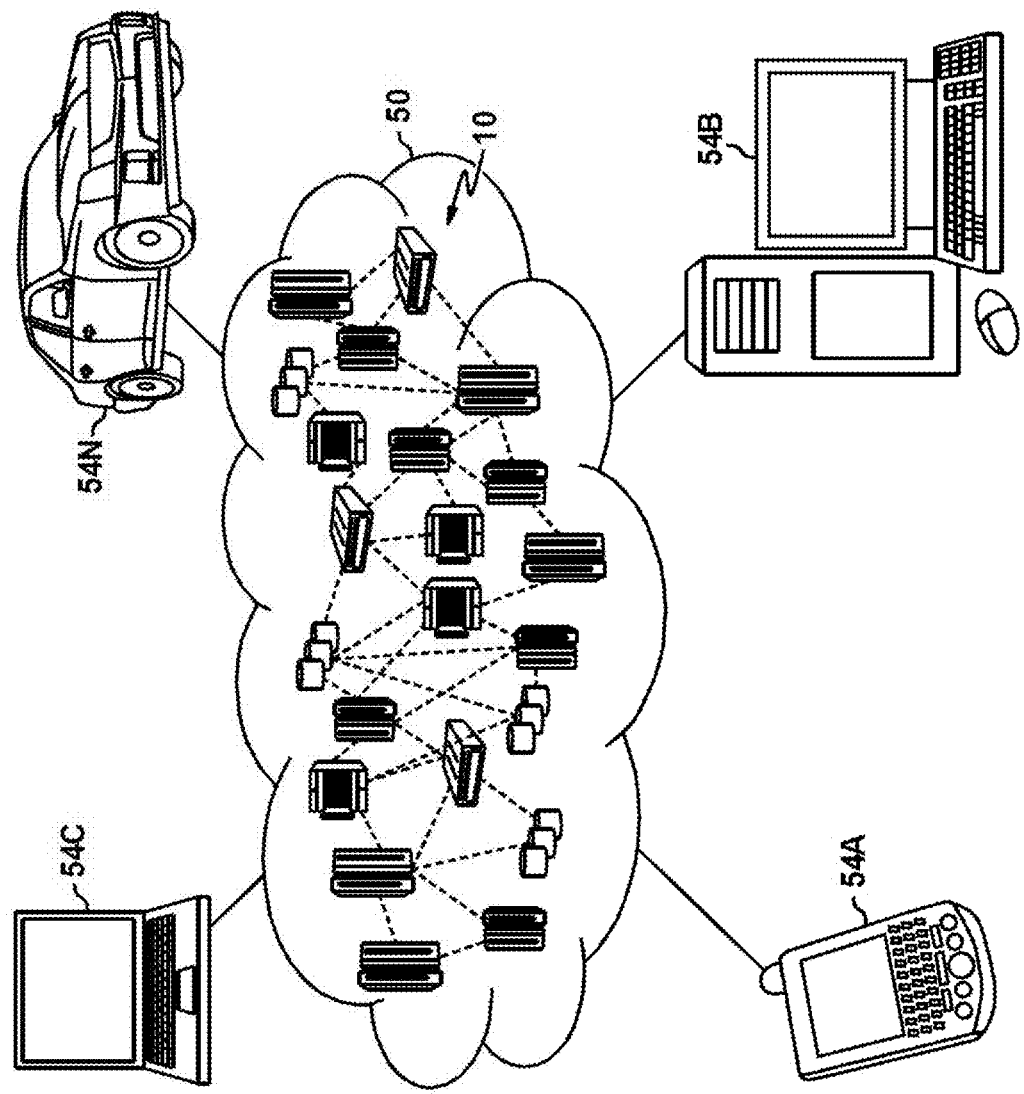
FIG. 15 depicts a cloud computing environment according to one or more embodiments of the present invention.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
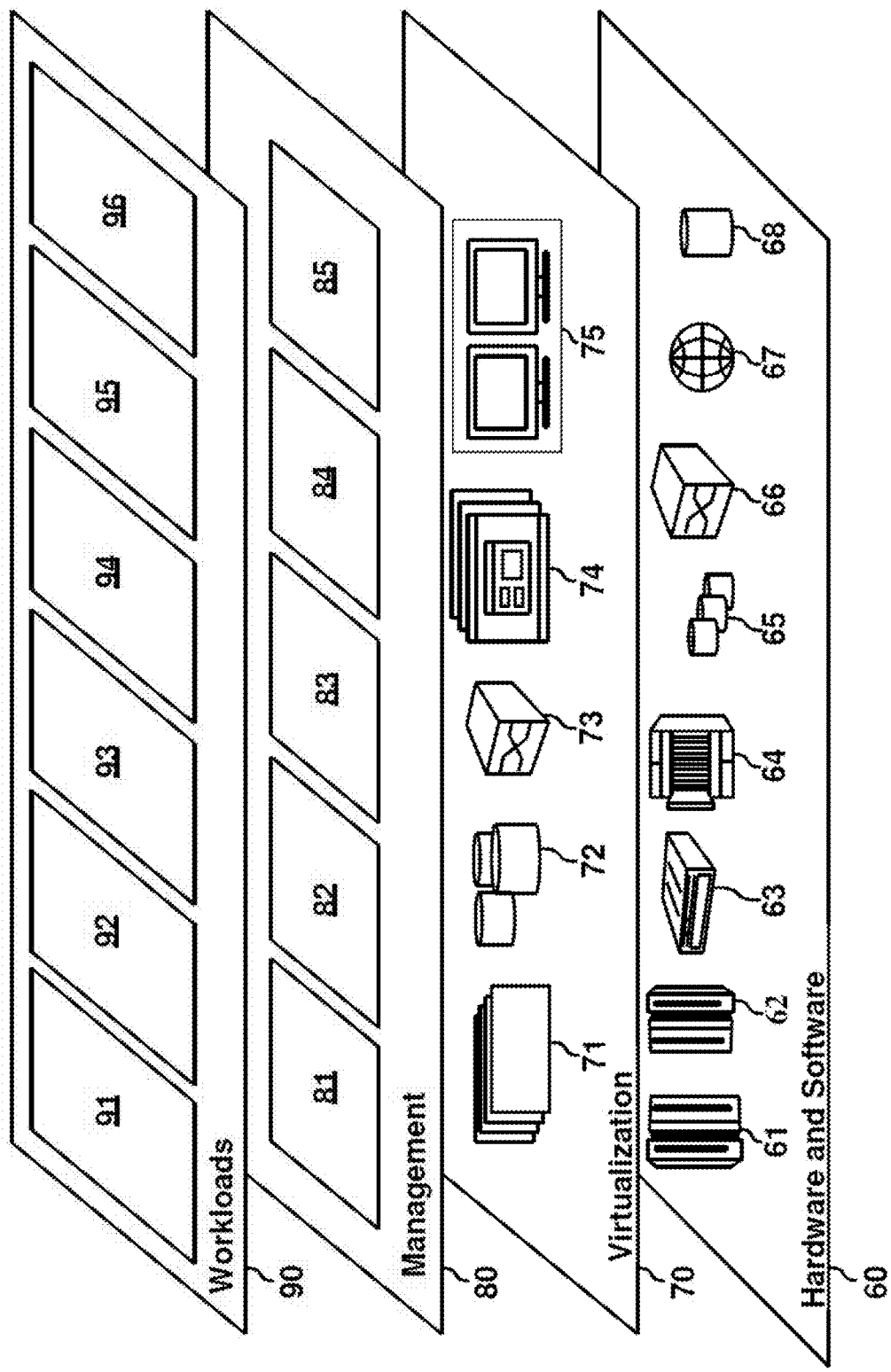
FIG. 16 depicts abstraction model layers according to one or more embodiments of the present invention.

Referring now to FIG. 16, a set of functional abstraction layers provided by cloud computing environment 50 (depicted in FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
inputting, by a processor, a change request of a change ticket to a first machine learning model, the first machine learning model determining at least one word pair in the change request, the change request being a modification in an information technology (IT) environment;
classifying, by the processor, the at least one word pair into a change category for the IT environment using a second machine learning model, the change category identifying a type of the modification to be executed in the IT environment to successfully resolve the change request;
determining, by the processor, a likelihood of causing a problem in the IT environment as a result of executing the modification to successfully resolve the change request as requested in the change ticket, wherein the likelihood of causing the problem in the IT environment is associated with a linkage between the change ticket and an incident ticket; and
in response to determining the likelihood of causing the problem in the IT environment as the result of executing the modification to successfully resolve the change request as requested in the change ticket, automatically performing, by the processor, an action to prevent the modification of the change request in the IT environment that is requested in the change ticket.

2. The computer-implemented method of claim 1, wherein the first machine learning model uses an ontology to determine the at least one word pair, the ontology comprising a knowledge base of IT concepts and relations among the concepts.

3. The computer-implemented method of claim 1, wherein the second machine learning model is trained on training data of change tickets for the IT environment in order to learn to classify the change tickets into change categories.

4. The computer-implemented method of claim 1, wherein:
the likelihood of causing the problem in the IT environment relates to a score that denotes a severity of the problem in response to performing the modification to successfully resolve the change ticket.

5. The computer-implemented method of claim 1, wherein determining the likelihood of causing the problem in the IT environment is based on; a failure risk dimension comprising one or more of a failure rate by change type, a failure rate by owner, a failure rate for similar changes, or a failure rate by configuration items; a major incident risk dimension, comprising an incident rate by change category; and an availability risk dimension comprising one or more of a mean time between failures or a mean time to resolve.

6. The computer-implemented method of claim 1, wherein automatically performing the action to prevent the modification of the change request in the IT environment comprises disabling an input to a display screen by requesting user input associated with a display box, in response to the likelihood of causing the problem in the IT environment meeting a predefined threshold.

7. The computer-implemented method of claim 6, wherein:
the predefined threshold is user configurable; and
disabling the input to the display screen prevents the problem from occurring in the IT environment.

8. A system comprising:
a memory having computer readable instructions; and
one or more processors for executing the computer readable instructions, the computer readable instructions controlling the one or more processors to perform operations comprising:
inputting a change request of a change ticket to a first machine learning model, the first machine learning model determining at least one word pair in the change request, the change request being a modification in an information technology (IT) environment;
classifying the at least one word pair into a change category for the IT environment using a second machine learning model, the change category identifying a type of the modification to be executed in the IT environment to successfully resolve the change request;
determining a likelihood of causing a problem in the IT environment as a result of executing the modification to successfully resolve the change request as requested in the change ticket, wherein the likelihood of causing the problem in the IT environment is associated with a linkage between the change ticket and an incident ticket; and
in response to determining the likelihood of causing the problem in the IT environment as the result of executing the modification to successfully resolve the change request as requested in the change ticket, automatically performing an action to prevent the modification of the change request in the IT environment that is requested in the change ticket.

9. The system of claim 8, wherein the first machine learning model uses an ontology to determine the at least one word pair, the ontology comprising a knowledge base of IT concepts and relations among the concepts.

10. The system of claim 8, wherein the second machine learning model is trained on training data of change tickets for the IT environment in order to learn to classify the change tickets into change categories.

11. The system of claim 8, wherein the likelihood of causing the problem in the IT environment relates to a score that denotes a severity.

12. The system of claim 8, wherein determining the likelihood of causing the problem in the IT environment is based on a failure risk dimension, a major incident risk dimension, and an availability risk dimension.

13. The system of claim 8, wherein automatically performing the action to prevent the modification of the change request in the IT environment comprises disabling an input to a display screen by requesting user input associated with a display box, in response to the likelihood of causing the problem in the IT environment meeting a predefined threshold.

14. The system of claim 13, wherein:
the predefined threshold is user configurable; and
disabling the input to the display screen prevents the problem from occurring in the IT environment.

15. A computer program product comprising a computer readable storage medium having program instructions embodied therewith, the program instructions executable by one or more processors to cause the one or more processors to perform operations comprising:
inputting, by a processor, a change request of a change ticket to a first machine learning model, the first machine learning model determining at least one word pair in the change request, the change request being a modification in an information technology (IT) environment;

classifying, by the processor, the at least one word pair into a change category for the IT environment using a second machine learning model, the change category identifying a type of the modification to be executed in the IT environment to successfully resolve the change request;

determining, by the processor, a likelihood of causing a problem in the IT environment as a result of executing the modification to successfully resolve the change request as requested in the change ticket, wherein the likelihood of causing the problem in the IT environment is associated with a linkage between the change ticket and an incident ticket; and in response to determining the likelihood of causing the problem in the IT environment as the result of executing the modification to successfully resolve the change request as requested in the change ticket, automatically performing, by the processor, an action to prevent the modification of the change request in the IT environment that is requested in the change ticket.

16. The computer program product of claim 15, wherein the first machine learning model uses an ontology to determine the at least one word pair, the ontology comprising a knowledge base of IT concepts and relations among the concepts.

17. The computer program product of claim 15, wherein the second machine learning model is trained on training data of change tickets for the IT environment in order to learn to classify the change tickets into change categories.

18. The computer program product of claim 15, wherein the likelihood of causing the problem in the IT environment relates to a score that denotes a severity.

19. The computer program product of claim 15, wherein determining the likelihood of causing the problem in the IT environment is based on a failure risk dimension, a major incident risk dimension, and an availability risk dimension.

20. The computer program product of claim 15, wherein automatically performing the action to prevent the modification of the change request in the IT environment comprises disabling an input to a display screen by requesting user input associated with a display box, in response to the likelihood of causing the problem in the IT environment meeting a predefined threshold.

21. The computer program product of claim 20, wherein:
the predefined threshold is user configurable; and
disabling the input to the display screen prevents the problem from occurring in the IT environment.

22. A computer-implemented method comprising:
receiving, by a processor, a change ticket, the change ticket being for a modification in an information technology (IT) environment;
classifying, by the processor, the change ticket into a change category that identifies a type of the modification to be executed in the IT environment, wherein classifying the change category is based on an ontology to successfully resolve the change request;

determining, by the processor, a likelihood of causing a problem in the IT environment as a result of executing the modification in the change ticket to successfully resolve the change request as requested in the change ticket, wherein the likelihood of causing the problem in the IT environment is associated with a linkage between the change ticket and an incident ticket; and in response to determining the likelihood of causing the problem in the IT environment as the result of executing the modification to successfully resolve the change request as requested in the change ticket, automatically preventing, by the processor, the modification of the change ticket in the IT environment that is requested in the change ticket until a user input is received.

23. The computer-implemented method of claim 22, wherein automatically preventing the modification of the change ticket in the IT environment until the user input is received comprises stopping an automatic resolution system from executing the modification of the change ticket.

24. The computer-implemented method of claim 22, wherein automatically preventing the modification of the change ticket in the IT environment until the user input is received comprises disabling input to a display screen by requesting the user input associated with a display box.

25. A system comprising:
a memory having computer readable instructions; and
one or more processors for executing the computer readable instructions, the computer readable instructions controlling the one or more processors to perform operations comprising:
receiving a change ticket, the change ticket being for a modification in an information technology (IT) environment;
classifying the change ticket into a change category that identifies a type of the modification to be executed in the IT environment, wherein classifying the change category is based on an ontology to successfully resolve the change request;
determining a likelihood of causing a problem in the IT environment as a result of executing the modification in the change ticket to successfully resolve the change request as requested in the change ticket, wherein the likelihood of causing the problem in the IT environment is associated with a linkage between the change ticket and an incident ticket; and
in response to determining the likelihood of causing the problem in the IT environment as the result of executing the modification to successfully resolve the change request as requested in the change ticket, automatically preventing the modification of the change ticket in the IT environment that is requested in the change ticket until a user input is received.

* * * * *